(12) United States Patent
Kakadia

(10) Patent No.: US 9,282,052 B2
(45) Date of Patent: Mar. 8, 2016

(54) END-TO-END QUALITY OF SERVICE OPTIMIZATION AND REPORTING

(71) Applicant: Verizon Patent and Licensing Inc., Arlington, VA (US)

(72) Inventor: Deepak Kakadia, Union City, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 198 days.

(21) Appl. No.: 13/904,805

(22) Filed: May 29, 2013

(65) Prior Publication Data

US 2014/0355439 A1    Dec. 4, 2014

(51) Int. Cl.
*H04L 12/873* (2013.01)
*H04L 12/875* (2013.01)

(52) U.S. Cl.
CPC .............. *H04L 47/522* (2013.01); *H04L 47/56* (2013.01)

(58) Field of Classification Search
CPC ....................................................... H04L 47/50
USPC ......................................................... 370/235
See application file for complete search history.

(56) References Cited

U.S. PATENT DOCUMENTS

| 5,982,748 | A * | 11/1999 | Yin et al. ........................ 370/232 |
| 6,980,511 | B1 * | 12/2005 | Li et al. ......................... 370/230 |
| 6,981,052 | B1 * | 12/2005 | Cheriton ........................ 709/232 |
| 7,406,098 | B2 * | 7/2008 | Taneja et al. ................... 370/468 |
| 2008/0117820 | A1 * | 5/2008 | Miyazaki et al. .............. 370/234 |

\* cited by examiner

*Primary Examiner* — Ian N. Moore
*Assistant Examiner* — Mewale Ambaye

(57) ABSTRACT

A system may be configured to identify a queue scheduler configuration associated with node of a network; and receive queue state information regarding the node. The queue state information may include information regarding at least one of: a measure of occupancy of one or more queues associated with the node, or a drop rate associated with the one or more queues associated with the node. The system may further determine, based on the received queue state information, that a performance of the one or more queues does not meet a threshold measure of performance; generate, based on determining that the performance of the one or more queues does not meet the threshold measure of performance, a modified queue scheduler configuration that is based on the identified queue scheduler configuration; and output, to the node, the modified queue scheduler configuration.

20 Claims, 18 Drawing Sheets

700 →

| Node ID | Bearer ID | PELR | Intra-node Latency | Throughput |
|---|---|---|---|---|
| Base station 305 | Bearer 1 | $10^{-6}$ | 0.2 ms | 1.7 MB/s |
| Base station 305 | Bearer 2 | $10^{-6}$ | 0.1 ms | 0.8 MB/s |
| SGW 325 | Bearer 2 | $10^{-3}$ | 0.2 ms | 0.8 MB/s |
| PGW 330 | Bearer 2 | $10^{-6}$ | 0.1 ms | 0.7 MB/s |
| PGW 330 | All bearers | $10^{-6}$ | 0.1 ms | 10.6 MB/s |

| Segment Start | Segment End | Bearer ID | PELR | Transport Latency | Throughput |
|---|---|---|---|---|---|
| Base station 305 | MLS 320 | Bearer 1 | $10^{-6}$ | 12 ms | 1.7 MB/s |
| Base station 305 | MLS 320 | Bearer 2 | $10^{-6}$ | 13 ms | 0.5 MB/s |
| MLS 320 | SGW 325 | Bearer 2 | $10^{-6}$ | 22 ms | 0.5 MB/s |
| SGW 325 | PGW 330 | Bearer 2 | $10^{-6}$ | 13 ms | 0.5 MB/s |
| SGW 325 | PGW 330 | All bearers | $10^{-6}$ | 14 ms | 17.5 MB/s |

FIG. 7B

| Node ID | Scheduler type | # of queues | Queue weight assignments | Queue param 1 | Queue param 2 | Queue length | WRED |
|---|---|---|---|---|---|---|---|
| Base station 305 | RR | 800 | 10%, 20%, ... | | | 63KB, 63KB, ... | |
| SGW 320 | PF | 63 | 10%, 20%, ... | 2 3 3 | 2 1 2 | 63KB, 128KB, ... | |
| PGW 330 | FIFO | 63 | 10%, 20%, ... | 0 | 0 | 63KB, 128KB, ... | |

| Queue ID | Avg. Queue Occupancy | Queue Drop Rate |
|---|---|---|
| Queue 1 | 85% | 50 bps |
| Queue 2 | 22% | 0 bps |
| Queue 3 | 77% | 10 bps |
| Queue 4 | 17% | 2 bps |

| Node ID | Queue ID | Avg. Queue Occupancy | Queue Drop Rate |
|---|---|---|---|
| Base station 305 | Bearer 1 | 85% | 45 bps |
| Base station 305 | Bearer 2 | 22% | 9 bps |
| SGW 320 | Bearer 2 | 77% | 1 bps |
| PGW 330 | Bearer 2 | 17% | 2 bps |

FIG. 9B

END-TO-END QUALITY OF SERVICE OPTIMIZATION AND REPORTING

BACKGROUND

Networks, such as wireless telecommunications networks, allow communication between user devices (such as cellular telephones) and other devices (such as servers, other user devices, etc.). Traffic to and/or from user devices may traverse multiple different network devices, such as base stations and/or gateways, and links between the network devices. These network devices may each employ different techniques for ensuring quality of service ("QoS") for traffic associated with the user devices. For instance, different vendors of different network devices may implement QoS traffic schedulers differently, which may result in end-to-end network, and per-segment, performance characteristics to vary greatly.

BRIEF DESCRIPTION OF THE DRAWINGS

FIGS. 7A and 7B illustrate example data structures that include information regarding measured KPIs;

FIG. 8 illustrates an example data structure that reflects the configuration of several queue schedulers;

FIGS. 9A and 9B illustrate example data structures that may include information regarding measured queue state information;

DETAILED DESCRIPTION OF PREFERRED EMBODIMENTS

The following detailed description refers to the accompanying drawings. The same reference numbers in different drawings may identify the same or similar elements.

Figure 1:
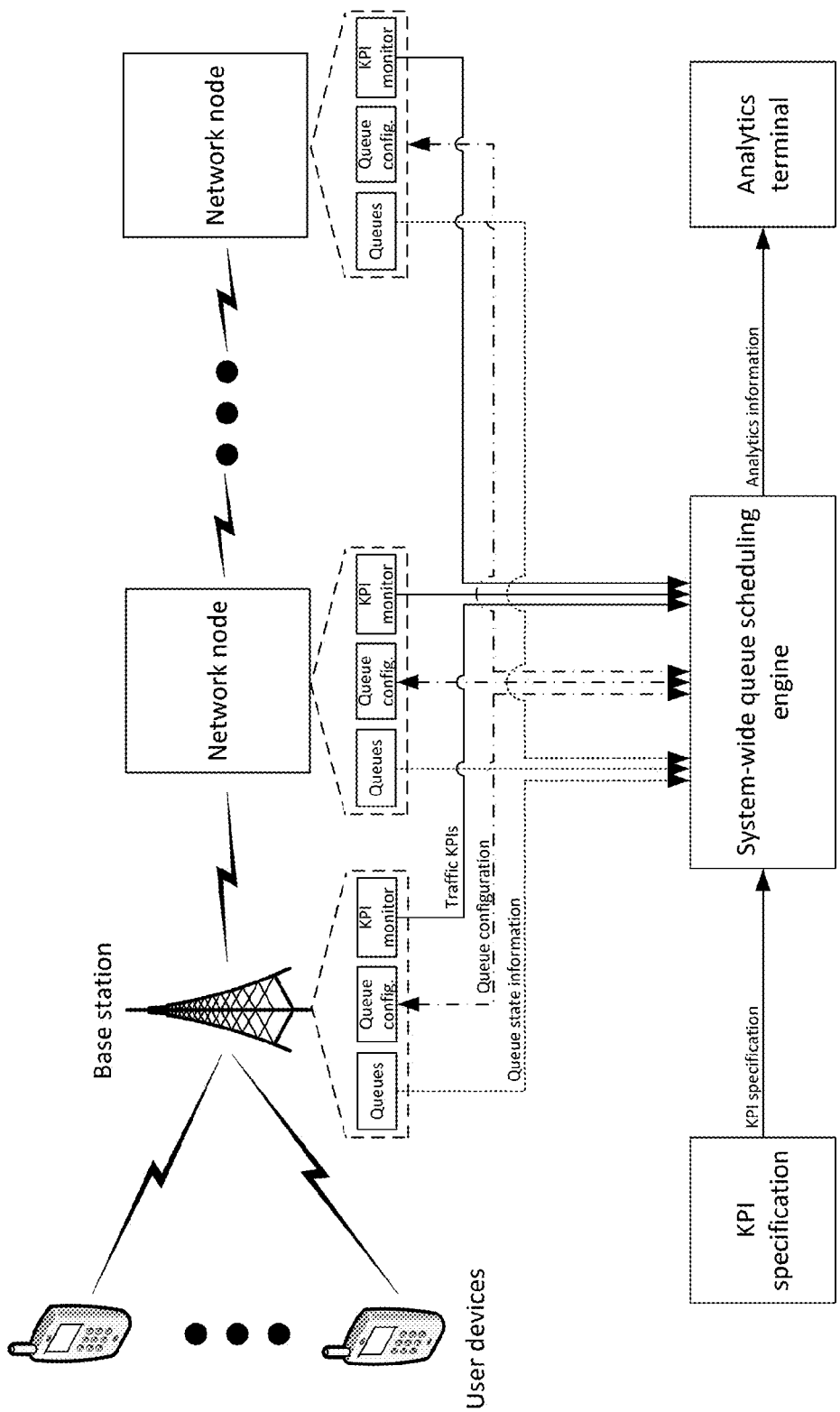
FIG. 1 illustrates an overview of one or more example implementations described herein.

Techniques described herein may allow for configurable end-to-end quality of service ("QoS") control in a network. FIG. 1 illustrates an overview of one or more example implementations described herein. As shown in FIG. 1, a set of user devices (e.g., cellular telephones) may be in communication with a base station of a wireless network. The network may be implemented through a set of network nodes (e.g., the base station, a cell site router ("CSR"), a serving gateway ("SGW"), etc.), through which traffic associated with the user devices may traverse. These various network nodes may each include a queue scheduler (which may be associated with a queue scheduler configuration and a set of queues), a key performance indicator ("KPI") monitor. The queue scheduler, associated with a particular network node, may schedule the processing of data, using a set of queues, received by and/or output from the particular network node. This processing may be based on a packet scheduler and/or queue configuration, which may specify parameters, such as queue weights, queue scheduling algorithms, queue lengths, and/or other queue-related parameters. The KPI monitor, associated with a particular network node, may monitor KPIs, on a per-queue and/or a per-flow basis, (such as throughput, latency, packet loss, or other KPIs) associated with data received by, and/or output from, the particular network node.

As also shown in FIG. 1, the base station and the network nodes may communicate with a system-wide queue scheduling engine ("SWQSE"). As described further below, the SWQSE may output queue scheduler configuration information (e.g., information specifying scheduling techniques, tunable parameters for the scheduling techniques, and/or other queue-related parameters) to the base station and/or the network nodes. In some implementations, the SWQSE may generate this information based on a KPI specification (e.g., a specification of maximum or minimum acceptable levels of various KPIs), queue scheduler configuration information associated with various network nodes, queue state information received from various network nodes, and/or KPI information received from various network nodes. Since the SWQSE receives information regarding specific queues and/or traffic flows, the SWQSE may be capable of making adjustments to enhance network performance on a per-queue, per-flow, and/or per-network node basis.

Queue schedulers associated with the network nodes may use the queue scheduler configuration information (e.g., scheduling techniques and/or tunable parameters), as determined by the SWQSE, when performing scheduling on data received by and/or output from a respective associated network node. In this sense, the SWQSE may act as a central controller for multiple network nodes (insomuch as the SWQSE may provide information regarding scheduling techniques and/or tunable parameters to these nodes), which may otherwise have performed queue scheduling independently.

Furthermore, since the SWQSE receives information (such as queue state information and/or KPI information) from multiple network nodes in a traffic flow path, the SWQSE may be capable of providing granular (e.g., on a per-network node, per-network segment, or per-link basis) performance information, as well as end-to-end performance information. For instance, the SWQSE may present, to a user (such as a network administrator), a user interface that displays latency (or other performance information) at a particular network node, latency on a link between network nodes (e.g., transport latency), latency across multiple network nodes and/or links, or end-to-end latency (e.g., latency between a traffic source, such as a user device, and a destination, such as an application server). The user may use this information in order to identify potential areas for improvement of network performance, and/or to identify points of failure in the network.

Furthermore, in some implementations, the SWQSE may compare performance information to configuration information and/or KPI specifications in order to identify anomalies, and may generate an alert or report regarding the anomalies. By alerting a user (e.g., an administrator) of such anomalies, the SWQSE may provide useful information, without flooding the user with unnecessary information (e.g., performance information regarding many network devices or links that are functioning properly).

By comparing actual, real-time performance information (e.g., KPI information and/or queue state information) to configurations and/or performance specifications, the SWQSE may be able to identify instances in which performance is below an expected threshold, and may aid in remedying such situations. Thus, the SWQSE may be beneficial in optimizing system performance, as well as providing analytics information regarding individual network devices and/or links. For example, as shown in FIG. 1, the SWQSE may output analytics information (e.g., collected and aggregated KPI and/or queue state information) to an analytics terminal, via which a user may access the analytics information.

Figure 2A:
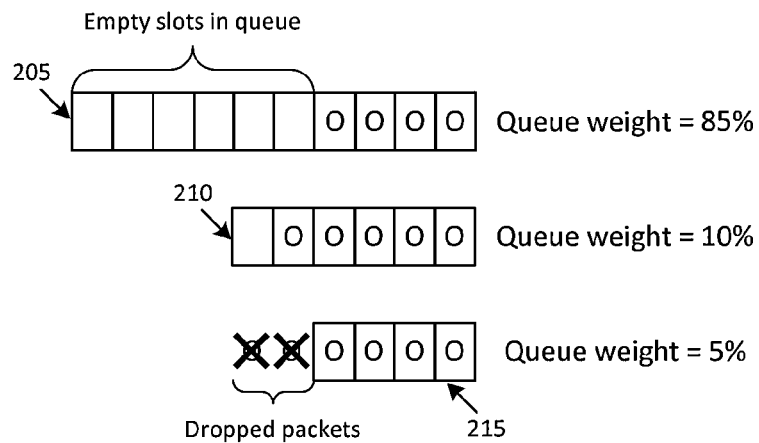
FIG. 2A conceptually illustrates a situation where queue scheduler reconfiguration may be desirable.

FIG. 2A conceptually illustrates a situation where queue scheduler reconfiguration may be desirable. FIG. 2A illustrates a set of queues 205, 210, and 215, which may correspond to, for example, a set of queues that are associated with a queue scheduler of a network node (such as a particular network node shown in FIG. 1). In some implementations, different queues may be used for different traffic flows, and/or different classes of traffic (e.g., different QoS class identifiers ("QCIs")).

A scheduler, associated with queues 205-215, may process the packets in these queues according to a scheduling configuration, which may specify a weighting algorithm, and parameters associated with the weighting algorithm. Assume, for example, that the weighting algorithm associated with the queues shown in FIG. 2A is a weighted queuing algorithm, such as weighted fair queuing ("WFQ"). As shown in FIG. 2A, queue 205 may be assigned a weight of 85%, queue 210 may be assigned a weight of 10%, and queue 215 may be assigned a weight of 5%.

As further shown, queue 205 may conceptually have a queue length of 10, (e.g., have a queue length that can accommodate 10 packets), queue 210 may have a length of 6, and queue 215 may have a queue length of 4. These lengths may dictate a maximum quantity of packets that may be stored in the queues before the packets are dropped. As shown in FIG. 2A, at a given time, queue 215 may fill up, and packets may be dropped from queue 215. The packets may be dropped because, for example, queue 215 is not long enough to support the packets, and/or because packets are not processed fast enough from queue 215 (e.g., may not be processed fast enough, due to the weight associated with queue 215).

Figure 2B:
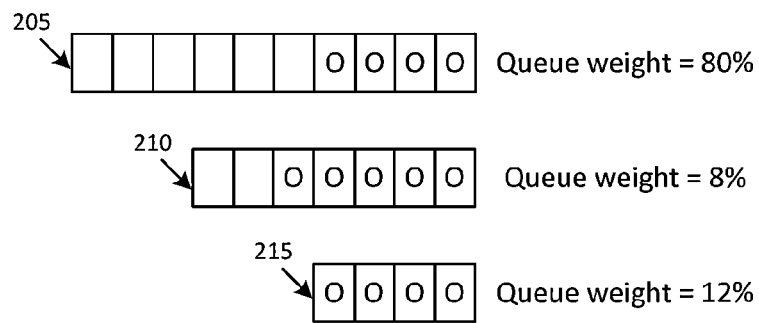
FIG. 2B conceptually illustrates an example result of modifying a queue scheduler configuration illustrated in FIG. 2A.

As described further below, the SWQSE may receive information regarding the state of queues 205-215, and may identify that packets are being dropped from queue 215. The SWQSE may further identify empty slots in queues 205 and/or 210, and/or may also identify that packets are not being dropped from queues 205 and/or 210. Based on some or all of these factors, the SWQSE may modify the queue scheduling parameters associated with queues 205-215. For example, as shown in FIG. 2B, the length and weights associated with queues 205-215 may be modified. For instance, the weights associated with queues 205 and 210 may be reduced, while the weight associated with queue 215 may be increased. As further shown, the length of queue 210 may be increased to account for the reduced weight. Because of the increased weight, packets in queue 215 may be processed faster, thus decreasing or eliminating the packets dropped from queue 215.

Some systems may include multiple nodes, which may each perform scheduling differently (e.g., may use different scheduling techniques, and/or may use different parameters for various scheduling techniques). Thus, the situations described above with respect to FIGS. 2A and 2B may occur unpredictably at different points within a particular system, and may yield unpredictable end-to-end system performance. Some implementations, described herein, may allow a system (such as a cellular telecommunications network) to be configured and re-configured to ensure optimal performance.

Figure 3:
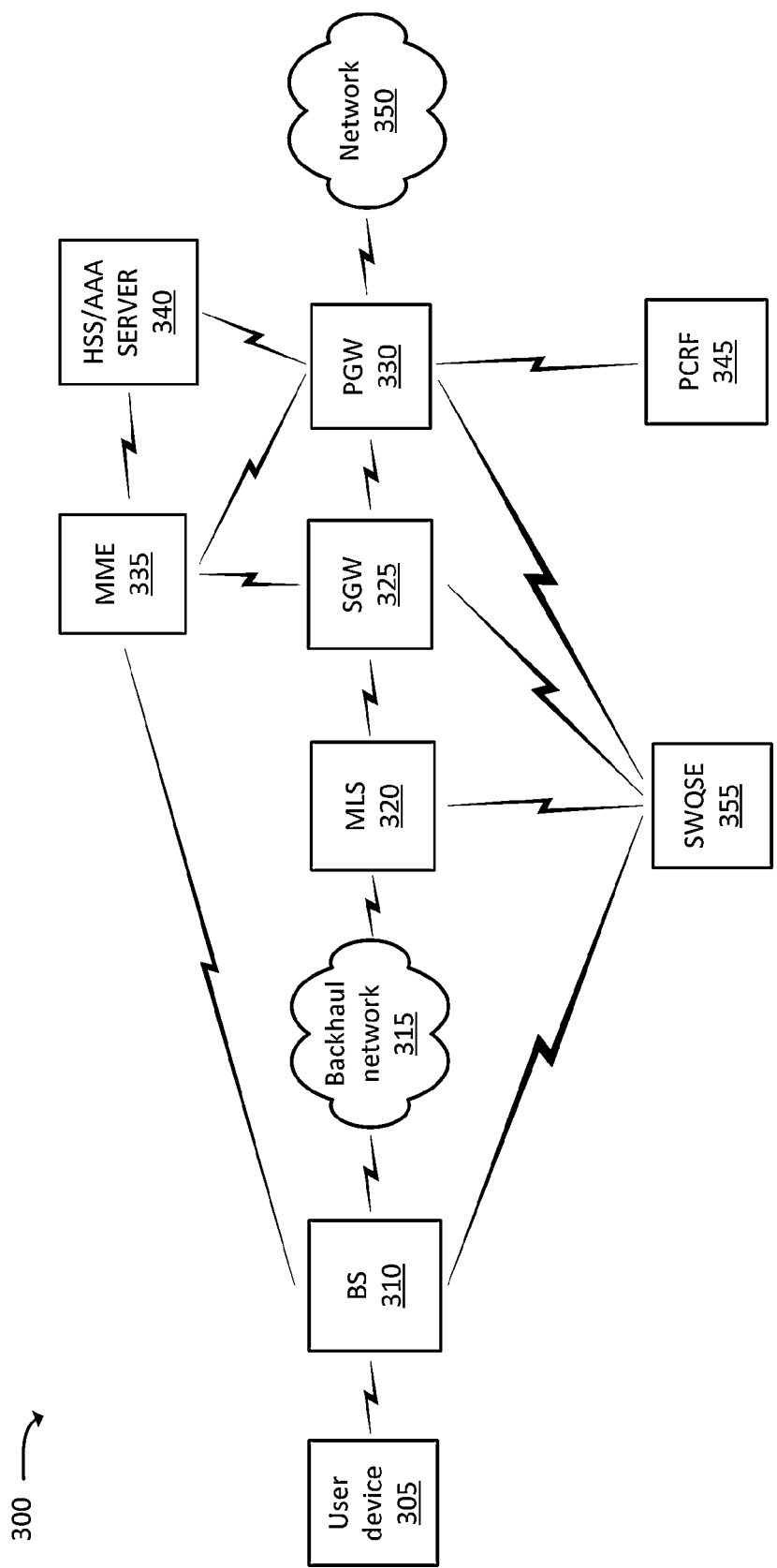
FIG. 3 illustrates an example environment in which systems and/or methods, described herein, may be implemented.

FIG. 3 illustrates an example environment 300, in which systems and/or methods described herein may be implemented. As shown in FIG. 3, environment 300 may include user device 305, base station 310 (which may, in some implementations, take the form of an evolved node B ("eNB")), backhaul network 315, multi-layer switch ("MLS") 320, SGW 325, packet data network ("PDN") gateway ("PGW") 330, mobility management entity device ("MME") 335, home subscriber server ("HSS")/authentication, authorization, accounting ("AAA") server 340 (hereinafter referred to as "HSS/AAA server 340"), policy charging and rules function ("PCRF") 345, network 350, and SWQSE 355.

The quantity of devices and/or networks, illustrated in FIG. 3, is provided for explanatory purposes only. In practice, there may be additional devices and/or networks; fewer devices and/or networks; different devices and/or networks; or differently arranged devices and/or networks than illustrated in FIG. 3. Alternatively, or additionally, one or more of the devices of environment 300 may perform one or more functions described as being performed by another one or more of the devices of environment 300. Devices of environment 300 may interconnect via wired connections, wireless connections, or a combination of wired and wireless connections.

Environment 300 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a radio access network ("RAN") that includes one or more base stations 310, some or all of which may take the form of an eNB, via which user device 305 may communicate with the EPC network. The EPC network may include one or more SGWs 325, PGWs 330, and/or MMEs 335, and may enable user device 305 to communicate with network 350 and/or an Internet protocol ("IP") multimedia subsystem ("IMS") core network. The IMS core network may include HSS/AAA server 340, and may manage authentication, session initiation, account information, a user profile, etc., associated with user device 305.

User device 305 may include any computation and communication device, such as a wireless mobile communication device that is capable of communicating with base station 310 and/or network 350. For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device. User device 305 may send traffic to and/or receive traffic from network 350 via base station 310, backhaul network 315, MLS 320, SGW 325, and/or PGW 330.

Base station 310 may include one or more network devices that receive, process, and/or transmit traffic, such as calls, audio, video, text, and/or other data, destined for and/or received from user device 305. In one example, base station 310 may be an eNB device and may be part of the LTE network. Additionally, or alternatively, one or more other base stations 310 may be associated with a RAN that is not associated with the LTE network (e.g., a wireless hot spot, a wireless access point, etc.). Base station 310 may receive traffic from and/or send traffic to network 350 via SGW 325 and PGW 330. Base station 310 may send traffic to and/or receive traffic from user device 305 via, for example, an air interface.

Backhaul network 315 may include one or more networking devices (e.g., routers and/or switches) and links (e.g., fiber or coaxial links), that connect respective base station 310 to a core network (e.g., a core network that includes MLS 320, SGW 325, and/or PGW 330). In some implementations, access to backhaul network 315 may be provided by a particular service provider, to a different service provider, who is associated with SGW 325, PGW 330, and/or network 350. Access to backhaul network 315 may be provided with QoS guarantees, such as a minimum guaranteed throughput, a maximum guaranteed latency, a minimum guaranteed reliability, and/or other QoS guarantees.

MLS 320 may include one or more network devices that perform switching functionality on traffic received from SGW 325 and/or backhaul network 315. MLS 320 may operate multiple layers of the Open Systems Interconnection ("OSI") reference model, in contrast with other switches that traditionally operate only on the Data Link Layer ("DLL"). For example, MLS 320 may perform deep packet inspection to perform routing functions.

SGW 325 may include one or more network devices that gather, process, search, store, and/or provide information in a manner described herein. SGW 325 may, for example, aggregate traffic received from one or more base stations 310 and may send the aggregated traffic to network 350 via PGW 330.

PGW 330 may include one or more network devices that gather, process, search, store, and/or provide information in a manner described herein. PGW 330 may aggregate traffic received from one or more SGWs 325, etc. and may send the aggregated traffic to network 350. PGW 330 may also, or alternatively, receive traffic from network 350 and may send the traffic toward user device 305 via SGW 325 and/or base station 310.

MME 335 may include one or more computation and communication devices that perform operations to register user device 305 with the EPS, to establish bearer channels associated with a session with user device 305, to hand off user device 305 from the EPS to another network, to hand off user device 305 from the other network to the EPS, and/or to perform other operations. MME 335 may perform policing operations on traffic destined for and/or received from user device 305.

HSS/AAA server 340 may include one or more server devices that manage, update, and/or store, in a memory associated with HSS/AAA server 340, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 305 and/or one or more other user devices 305. Additionally, or alternatively, HSS/AAA server 340 may perform authentication, authorization, and/or accounting operations associated with the subscriber and/or a communication session with user device 305.

PCRF 345 may include one or more server devices that aggregate information to and from the EPC network and/or other sources. PCRF 345 may receive information regarding policies and/or subscriptions from one or more sources, such as subscriber databases and/or from one or more users (such as, for example, an administrator associated with PCRF 345).

Network 350 may include one or more wired and/or wireless networks. For example, network 350 may include a packet data network ("PDN"), such as an IP-based PDN. Network 350 may include, for example, a wide area network such as the Internet, or one or more other networks. User device 305 may connect, through PGW 330, to data servers, application servers, or to other servers/applications that are coupled to network 350.

SWQSE 355 may receive information (e.g., KPI information and/or queue state information) from network nodes that serve as signal bearers for traffic to and/or from user device 305 (e.g., base station 310, MLS 320, SGW 325, and/or PGW 330), and/or from another device. As described further below, SWQSE 355 may aggregate KPI information and/or queue state information, received from multiple network nodes, in order to generate useful information regarding traffic. As also described below, SWQSE 355 may compare the KPI information and/or queue state information to KPI specification information (e.g., information specifying thresholds of acceptable performance) and/or queue scheduler configuration information, in order to determine whether improvements can be made (e.g., modifications to queue scheduler configurations of one or more network nodes).

In order to provide information to SWQSE 355, network nodes may be associated with hardware and/or software that monitor traffics received and/or sent by network nodes. As described further below, this hardware and/or software may analyze monitored traffic to determine, for example, KPI information associated with a respective network node or a link between network nodes, and may provide the information to SWQSE 355. In some implementations, one network node may receive information from another network node, in order to determine KPI information regarding a link between the network nodes. For example, a first network node may receive information from another network node regarding a particular packet, and may determine one or more KPIs based on this information (e.g., transport latency associated with a link between the first and second network nodes, packet drop rate, etc.).

In some implementations, SWQSE 355 may communicate with network nodes over existing communication links. That is, while SWQSE 355 is conceptually illustrated in FIG. 3 as being connected to base station 310, MLS 320, SGW 325, and PGW 330, in practice, the actual communication paths between these network nodes and SWQSE 355 may be different than the illustrated path. For example, in some implementations, SWQSE 355 may be communicatively coupled to base station 310 via network 350. In some such implementations, for example, base station 310 may communicate with SWQSE 355 via backhaul network 315, MLS 320, SGW 325, PGW 330, and/or any other intervening devices. In other implementations, one or more network nodes may include one or more other communication links to SWQSE 355 (e.g., direct and/or indirect communication links).

In some implementations, the data sent from network nodes to SWQSE 355 may be of a relatively low priority, such that this data does not preempt user data (e.g., data sent to and/or from user device 305). For example, network nodes may set a priority flag, of data sent to SWQSE 355, to be lower than a priority that is associated with user data. For instance, this priority flag may be set to a lowest possible priority. In some situations, such data may be referred to as "bulk data," or as being associated with a "scavenger class." As may be apparent from the above discussion, in some implementations, the information sent from network nodes to SWQSE 355 may include information regarding packets, without including all packet information. For instance, the information may include a portion or entirety of header information, of a particular packet, without including some or all of the payload (or content) information, of the particular packet.

Figure 4:
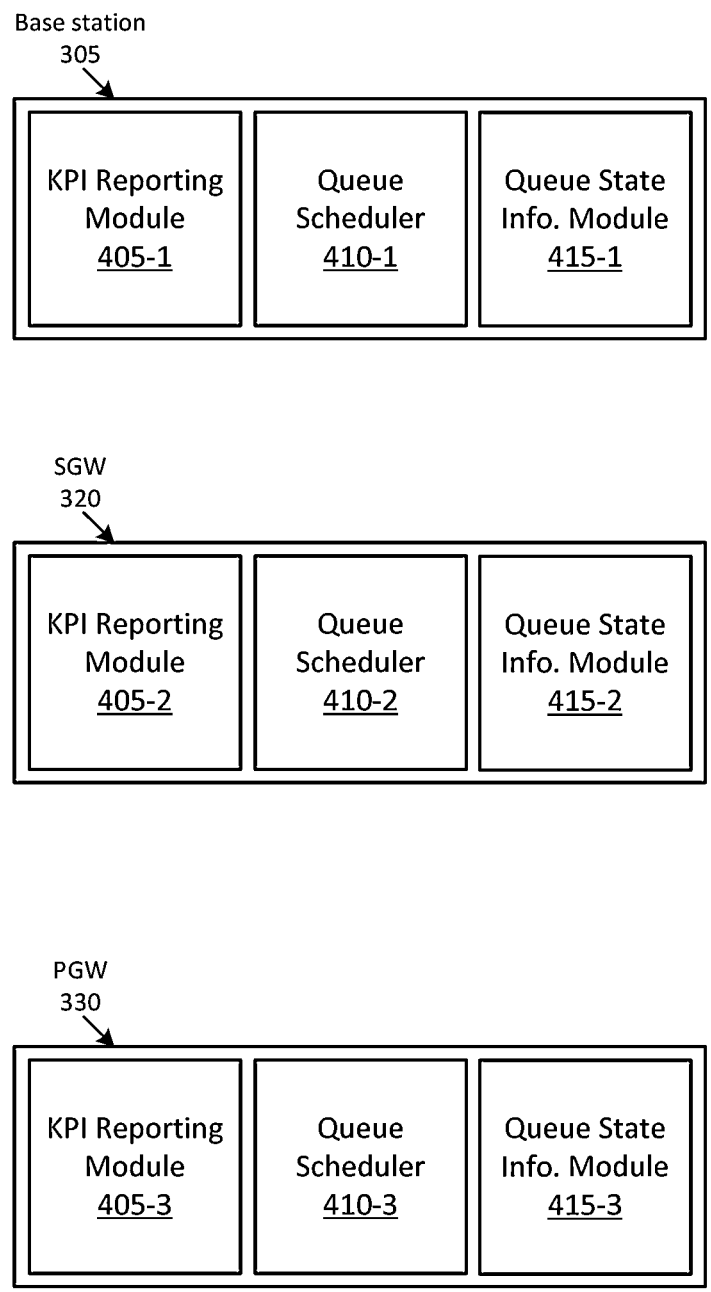
FIG. 4 illustrates example functional components of network nodes, according to some implementations described herein.

FIG. 4 illustrates example functional components of network nodes. For example, FIG. 4 illustrates an example base station 305, SGW 320, and PGW 330. Base station 305 may include KPI reporting module 405-1, queue scheduler 410-1, and queue state information module 415-1; SGW 320 may include KPI reporting module 405-2, queue scheduler 410-2, and queue state information module 415-2; and PGW 330 may include KPI reporting module 405-3, scheduler 410-3, and queue state information module 415-3. KPI reporting modules 405-1 through 405-3 may be collectively referred to herein as "KPI reporting modules 405," or individually as "KPI reporting module 405;" queue schedulers 410-1 through 410-3 may be collectively referred to as "queue schedulers 410," or individually as "queue scheduler 410;" and queue state information modules 415-1 through 410-3 may be collectively referred to herein as "queue state information modules 415," or individually as "queue state information module 415."

A particular KPI reporting module 405 may receive information regarding one or more KPIs associated with a particular network node, and may store and/or output some or all of the received information (e.g., to SWQSE 355). For example, KPI reporting module 405-1, which is associated with base station 305, may receive information regarding KPIs, such as throughput of data sent to one or more user devices 305, throughput of data received from one or more user devices 305, latency of data sent to one or more user devices 305, latency of data received from one or more user devices 305, signal strength (e.g., as expressed in terms of signal-to-noise ratio) of signals sent to and/or received from one or more user devices 305, packet loss of data sent to one or more user devices 305, and/or one or more other KPIs. KPI reporting module 405-1 may receive such KPI information from one or more components of base station 305, which may be configured to measure or otherwise determine such information. KPI reporting modules 405 associated with other nodes may also receive KPI information regarding data sent to/or from those nodes (e.g., throughput and/or latency).

A particular queue scheduler 410 may perform scheduling functions for the processing of data received by and/or outputted by a particular node. Queue scheduler 410 may perform scheduling functions using one or more scheduling techniques, such as a sound robin ("RR") scheduling technique, a proportionally fair ("PF") scheduling technique, a WFQ scheduling technique, a shortest job first ("SJF") scheduling technique, a shortest time remaining ("STR") scheduling technique, a fixed priority preemptive ("FPP") scheduling technique, a multi-level queue ("MQ") scheduling technique, another scheduling technique, and/or a combination of one or more scheduling techniques.

Queue state information module 415 may be associated with a queue scheduler configuration, which may specify the scheduling technique(s) used by queue state information module 415, as well as parameters associated with those techniques. These parameters may include, for example, queue weights, quantity of queues, queue length, and/or other parameters (e.g., parameters that are specific to respective queue scheduling techniques).

Queue scheduler 410 may, for example, use a scheduling technique to determine an order in which data packets, received and/or output by an associated node, should be processed (e.g., an order in which data packets should be analyzed and/or outputted from the associated node). For instance, queue scheduler 410 may maintain or monitor one or more queues. The queues may be used to maintain an order in which data packets, associated with user devices, are processed.

For example, under a RR scheduling technique, queue scheduler 410 may assign the same amount of resources (e.g., equivalent time slices) to data packets associated with each of multiple different user devices. Assume, for instance, that queue scheduler 410-1 determines that base station 305 receives four data packets—packets $p_0$, $p_1$, $p_2$, and $p_3$. Further assume that packets $P_0$ and $p_1$ are addressed to a first user device, and that packets $p_2$ and $p_3$ are addressed to a second user device. Using the RR scheduling technique, queue scheduler 410-1 may place packets $p_0$ and $p_1$ in a first queue associated with the first user device, and may place $p_2$ and $p_3$ in a second queue associated with the second user device. Using the RR scheduling technique, queue scheduler 410-1 may read the packets, for processing, from the two queues in an alternating schedule, and may eventually place the packets in an egress queue in the following order: $p_0$, $p_2$, $p_1$, and $p_3$.

As another example, when using a PF scheduling technique, different user devices may be associated with different priorities. In this example, queue scheduler 410 may assign resources proportionally based on priorities associated with different QCI classes of various traffic flows. For instance, assume that a first traffic flow (e.g., a traffic flow that corresponds to a voice call) is associated with a higher priority than a second traffic flow (e.g., a traffic flow that corresponds to a data file transfer). Queue scheduler 410 may assign more resources for processing data packets associated with the first traffic flow than for processing data packets associated with the second traffic flow.

As discussed with respect to the above examples, queue scheduler 410 may schedule data packets according to one or more scheduling techniques (e.g., RR, PF, WFQ, etc.). Some of these techniques may be based on one or more parameters. For example, a PF technique may be based on a parameter that indicates how many resources should be allocated to a particular priority level (e.g., in the example above, this parameter may indicate that data packets associated with a particular user device should be allocated twice the resources as compared to data packets associated with a another user device). As another example, a RR technique may be based on a parameter that indicates how long of a time slice should be allocated equally to multiple user devices (e.g., allocate a 10-millisecond time slice per user device, allocate a 1-second time slice per user device, etc.).

As yet another example, another parameter that may be used under one or more scheduling techniques may be queue length. Queue length may refer to how much data (e.g., a quantity of data packets, a cumulative size of data packets, etc.) may be stored by a particular queue before data packets are discarded, or dropped (e.g., dropped in a first in first out ("FIFO") fashion, last in first out ("LIFO") fashion, or some other fashion). For instance, a shorter queue length may correspond to a lower upper bound on the max queuing latency if the packet is not dropped, while a longer queue length may correspond to a higher upper bound on the max queuing latency if the packet is not dropped. While some example scheduling techniques and parameters were discussed above, different and/or additional scheduling techniques and/or parameters may be used in practice.

A particular queue state information module 415 may monitor the state of queues associated with a particular queue scheduler 410, and may store or output information regarding the state of the queues. For instance, queue state information module 415-1 may monitor the fullness of queues associated with queue state information module 415-1, drop rates of packets from queues associated with queue state information module 415-1, average packet processing time (e.g., average overall or per-queue latency, as measured based on a time at which a packet was received at a queue and a time at which the packet was output from the queue), and/or other queue-related state information. As described below, queue state information module 415 may output queue state information to, for example, SWQSE 355, which may determine whether performance can be improved by modifying queue scheduler configurations.

Figure 5:
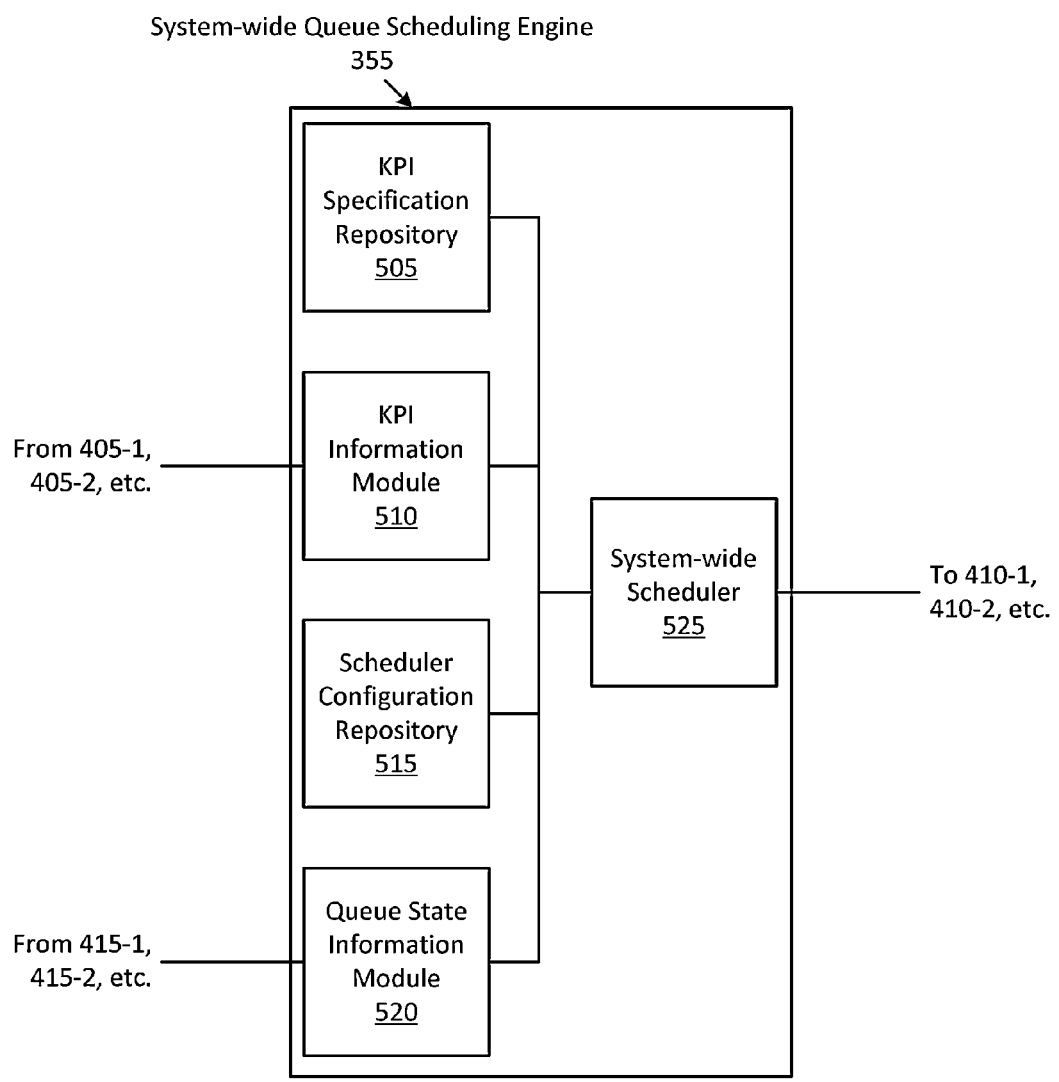
FIG. 5 illustrates example functional components of a system-wide queue scheduling engine, according to some implementations described herein.

FIG. 5 illustrates example functional components of an example SWQSE 355. As shown, SWQSE 355 may include KPI specification repository 505, KPI information module 510, scheduler configuration repository 515, queue state information module 520, and system-wide scheduler 525. In some implementations, modules 505-525 may be implemented via hardware and/or software. In some implementations, SWQSE 355 may include additional, fewer, different, or differently arranged modules than those illustrated in the example shown in FIG. 5.

KPI specification repository 505 may receive and store KPI specification information, which may indicate threshold levels of traffic KPIs. These threshold levels may correspond to, for example, expected and/or minimum acceptable levels of traffic performance. KPI specification information may be based on, for example, configurations or attributes of individual network nodes and/or links between network nodes. For example, KPI specification information may include information regarding physical locations of network nodes, service level agreement ("SLA") specifications of guaranteed latency or bandwidth through particular network nodes (e.g., a minimum amount of throughput or maximum latency that a particular network node provides), SLA specifications of guaranteed latency or bandwidth through particular links (e.g., a minimum amount of throughput or maximum latency that a particular link provides), maximum end-to-end latency (e.g., a maximum expected or acceptable latency between one network node and another network node), etc.

In some implementations, KPI specification repository 505 may receive some or all of the KPI specification information from individual network nodes. In some implementations, KPI specification repository 505 may receive some or all of the KPI specification information from another source, such as from a device that collects, calculates, and/or receives KPI specification information. KPI specification repository 505 may, in some implementations, receive KPI specification information from a user, such as an administrator or a vendor associated with one or more network nodes or links.

Figure 6:
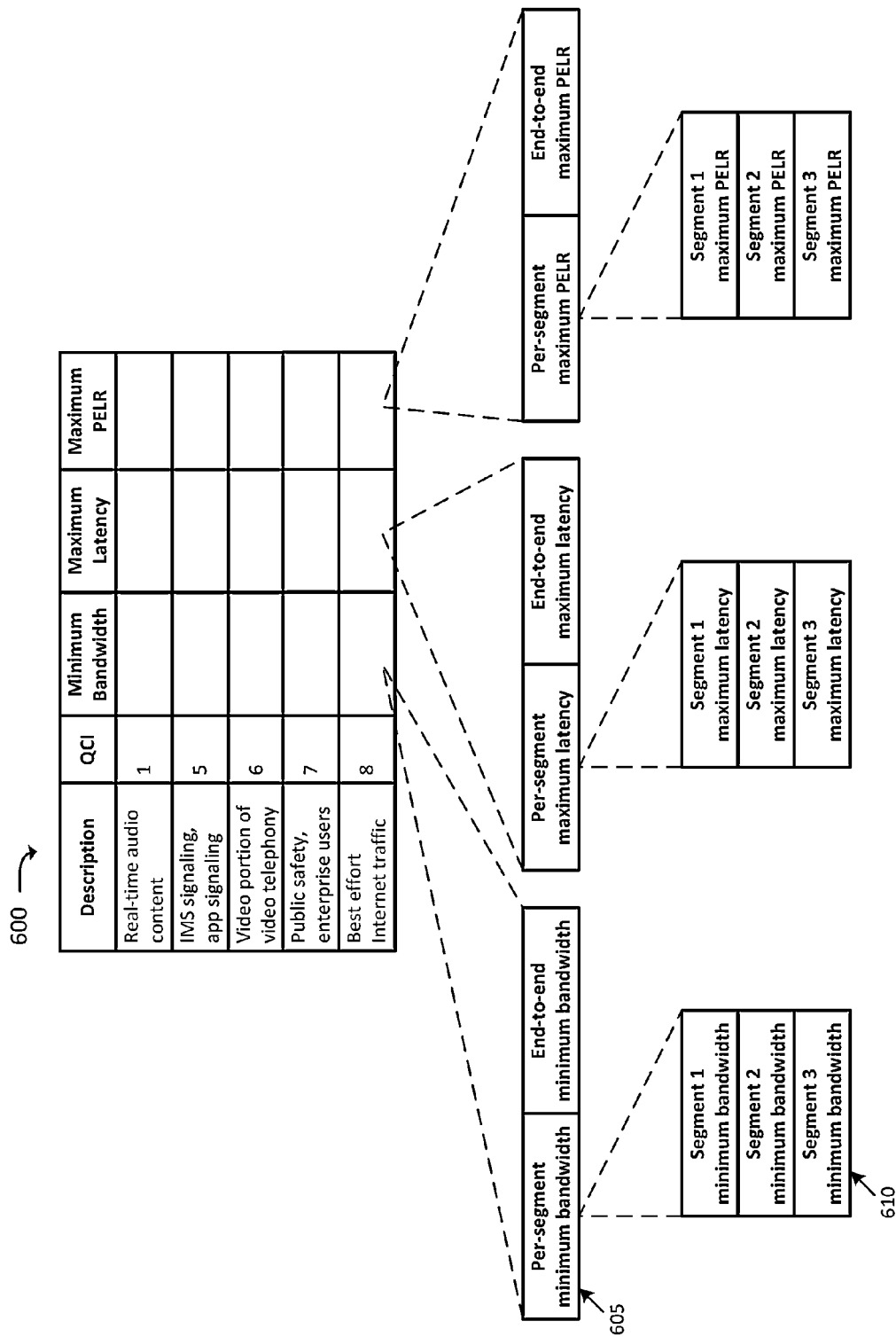
FIG. 6 illustrates an example data structure that may reflect a specification of expected key performance indicators ("KPIs")

FIG. 6 illustrates an example data structure 600 that may be stored by KPI specification repository 505, which may include KPI specification information. As shown, data structure 600 may include information regarding descriptions of various types of traffic, QCIs associated with traffic types, minimum bandwidth, maximum latency, and maximum packet error loss rate ("PELR"). The information regarding the minimum bandwidth, maximum latency, and maximum PELR may correspond to KPI thresholds that are associated with a level of expected or desired network performance. These values may be set by, for example, a network administrator. In some implementations, one or more of these values may be values that are provided by a vendor or operator associated with a network node or a link between network nodes. For example, a provider of backhaul network 315 may provide information indicating a maximum latency that will be provided by backhaul network 315.

Descriptions of traffic types may indicate types of traffic, which are associated with other parameters stored in data structure 600. For instance, as shown, real-time audio content (e.g., voice call traffic, or an audio portion of a video call) may be associated with a QCI of "1," which may be a highest QCI of the QCIs shown in FIG. 6. In some implementations, the descriptions may be used for informational purposes. For instance, a network administrator who is accessing or modifying information in data structure 600 may use the descriptions to aid the network administrator in identifying which QCIs are associated with which types of traffic.

As further shown in FIG. 6, the information regarding minimum bandwidth, maximum latency, and maximum PELR may be organized using other data structures nested within data structure 600. For instance, a particular cell in data structure 600, that corresponds to the minimum bandwidth for a particular QCI, may include data structure 605, which may store information regarding a per-segment minimum bandwidth and an end-to-end minimum bandwidth. End-to-end bandwidth may refer to a bandwidth of traffic between a source and a destination of traffic (e.g., between user device 305 and network 350), and per-segment bandwidth may refer to bandwidth of traffic from one network node to another network node.

A segment may be defined inclusively or exclusively. For instance, in some situations a segment may be defined in terms of a segment between base station 310 and MLS 320, exclusive. This segment may include, for example, backhaul network 315 (and any other devices and/or links between base station 310 and MLS 320), but not base station 310 or MLS 320 themselves. In other situations, assume that a segment is defined as being a segment between base station 310 and MLS, 320, inclusive. This segment may include, for example, base station 310, backhaul network 315, and MLS 320.

As further shown in FIG. 6, data structure 605 may include one or more nested instances of data structure 610. Data structure 610 may include information identifying a segment, as well as a value for the minimum bandwidth expected or desired for traffic being transmitted along the segment. In some implementations, a segment may be defined in terms of a starting network node and an ending network node (or, more generally, two network nodes that define endpoints of the segment). In some implementations, a segment may be defined as a link between two network nodes. In some implementations, although not shown, data structure 610 may include minimum bandwidth information for a single network node (e.g., a minimum expected or desired bandwidth for traffic passing through the node). As additionally shown, data structures similar to data structures 605 and 610 may be used to store information regarding minimum latency and minimum PELR. Returning to FIG. 5, KPI information module 510 may receive and/or store information regarding KPIs, which may be measured or identified at various network nodes. For example, KPI information module 510 may receive KPI information from base station 305, SGW 320, and/or PGW 330 (e.g., from KPI reporting modules 405 that are each associated with a particular network node). As mentioned above, the KPI information may be related to throughput, latency, packet loss, and/or other KPIs.

FIGS. 7A and 7B illustrate example data structures 700 and 750 that may be stored by KPI information module 510. The information in data structures 700 and/or 750 may be received by, or may be based on, KPI information received from network nodes. The information stored in data structure 700 may include KPI information for network nodes, while the information stored in data structure 750 may include KPI information for network segments (e.g., links between network nodes).

As shown in FIG. 7A, data structure 700 may include information regarding various network nodes and/or bearers that are handled by the nodes. The information may include, for example, a network node identifier ("Node ID," such as a device name, a device type, an Internet Protocol ("IP") address, and/or any other type of identifier), bearer identifier ("Bearer ID"), packet error loss rate ("PELR"), intra-node latency, and throughput.

As may be apparent from the figure, data structure 700 may include information regarding multiple specific bearers at a particular network node (e.g., bearer 1 and bearer 2 at base station 305). In some situations, these multiple bearers may correspond to traffic according to multiple different QCIs, traffic that corresponds to multiple different user devices 305, and/or traffic that corresponds to multiple different applications.

The example intra-node latency field, for a particular bearer, may refer to an average amount of time that packets, associated with the particular bearer, spend at a particular network node. Intra-node latency for a particular packet may be based on, for example, a time at which the packet was received by the particular network node and a time at which the packet was output by the particular network node. The example throughput field, for a particular bearer, may indicate an average throughput of data packets, associated with the bearer, through the corresponding network node.

As also may be apparent from the figure, data structure 700 may correlate KPI information for multiple bearers to a particular network node that handles the bearers. For example, as shown, data structure 700 may include information for all of the traffic handled by PGW 330 (e.g., all bearers).

As shown in FIG. 7B, data structure 750 may include information regarding various network segments and/or bearers that are handled by the nodes. The information may include, for example, a Node ID of a beginning of the segment ("Segment Start"), a Node ID of an end of the segment ("Segment End"), Bearer ID, PELR, transport latency, and throughput.

As mentioned above, a network segment may be a portion of a network that includes a link between two or more network nodes. As shown in FIG. 7B, one possible technique of defining a network segment is by identifying two network nodes that are at opposite endpoints of the network segment. In practice, other techniques of identifying network segments may be possible. The latency field for a particular bearer, in data structure 750, may refer to an average amount of time that packets, associated with the particular bearer, spend on one or more links, and/or at one or more intervening devices, between the segment start and the segment end. For instance, the transport latency field shown for bearer 1 between base station 305 and MLS 320 may be useful in identifying a latency associated with backhaul network 315.

While data structures 700 and 750 are shown with average values (e.g., values for PELR, latency, and throughput that correspond to KPIs that have been recorded and averaged over a period of time), in some implementations, KPI information module 510 may store more information in a more temporally granular fashion. For example, KPI information module 510 may store information, indicating times at which KPI information is received and/or recorded, with corresponding KPI information. The time information may be used to calculate average or instantaneous values of KPIs at particular times or periods of time. For instance, as described further below, assume that the example information shown in FIG. 7A corresponds to average values that correspond to one hour's worth of KPI information. In some implementations, KPI information module 510 may store granular time information for the KPI information, such that KPI information for specific time windows (e.g., a ten-minute window, a one-minute window, a one-second window, etc.), within the hour, may be identified.

Returning to FIG. 5, scheduler configuration repository 515 may receive and store information regarding configurations of queue schedulers that are associated with various network nodes. For example, scheduler configuration repository 515 may receive information regarding a configuration of a queue scheduler associated with base station 310, information regarding a configuration of a queue scheduler associated with MLS 320, etc.

FIG. 8 illustrates an example data structure 800 that may be stored by scheduler configuration repository 515, which may include queue scheduler configuration information. As shown, data structure 800 may include information regarding various nodes, such as base station 310, SGW 320, and PGW 330. Data structure 800 may include, for example, identifying information for nodes, ("Node ID," such as a device name, a device type, an Internet Protocol ("IP") address, and/or any other type of identifier), and information identifying types of schedulers (e.g., scheduling techniques) used by the nodes ("Scheduler type"). As also shown, data structure 800 may include information regarding tunable parameters for scheduling techniques, such as a number of queues, queue weight assignments, other parameters that may be used for scheduling techniques (shown in FIG. 8 as "Queue param 1" and "Queue param 2;" in practice, any quantity of queue parameters may be used), queue length, and weighted random early discard ("WRED") parameters.

The parameters for scheduling techniques (e.g., Queue param 1 and Queue param 2), stored by data structure 800, may correspond to types of parameters that are relevant to corresponding scheduling techniques. For example, as shown in FIG. 8, data structure 800 may not store values for Queue param 1 and Queue param 2 for the RR scheduling technique associated with base station 310. The Queue param 1 and Queue param 2 values, stored by data structure 800, for SGW 320 may correspond to PF-specific parameters (e.g., different priorities associated with the PF scheduling technique).

The WRED field, stored by data structure 800, may be used to specify a manner in which full queues will drop packets. For example, the WRED field may store probabilities of drop at certain queue occupancies, mapped to Differentiated Services Code Point ("DSCP") code points that correspond to drop precedence. In some implementations, a particular value stored in the WRED field (e.g., a value of 0) may indicate that WRED should not be used when dropping packets. In such situations, a different technique may be used to drop packets, such as a tail drop technique.

Returning to FIG. 5, queue state information module 520 may receive and store information regarding the state of queues associated with various network nodes. For example, network nodes may output queue state information (via a respective queue state information module 415) to queue state information module 520. As mentioned above, queue state information may include information regarding fullness of queues, queue drop rate, and/or other information. In some implementations, queue state information may include information that can be used to correspond a queue, or a set of queues, to a particular bearer.

FIGS. 9A and 9B illustrate example data structures 900 and 950, which may be stored by queue state information module 520. Data structure 900 may include queue state information for a particular node, arranged on a per-queue basis. Data structure 950 may include queue state information for one or more nodes, arranged on a per-bearer basis. In some implementations, queue state information module 520 may store multiple instances of each of data structure 900 and/or data structure 950. For example, queue state information module 520 may store multiple instance of data structure 900, each instance including queue state information for a different network node.

As shown in FIG. 9A, the information stored in data structure 900 may include average queue occupancy and queue drop rate for queues of a network node. The average queue occupancy may indicate an average fullness a particular queue over a period of time, and the queue drop rate field may indicate a rate at which data is dropped from a particular queue. In some implementations, the queue drop rate may be expressed as bits per second ("bps"). In other implementations, the queue drop rate may be expressed in terms of different units.

As shown in FIG. 9B, the information stored in data structure 950 may include average queue occupancy and queue drop rate. The average queue occupancy may indicate an average fullness of one or more queues, associated with a particular bearer, at a particular network node, over a period of time. The queue drop rate field may indicate a rate at which data is dropped from a particular queue, or set of queues.

While data structures 900 and 950 are shown with average values (e.g., values for queue occupancy and queue drop rate), in some implementations, queue state information module 520 may store more information in a more temporally granular fashion. For example, queue state information module 520 may store information, indicating times at which queue state information is received and/or recorded, with corresponding queue state information. The time information may be used to calculate average or instantaneous queue state information values at particular times or periods of time.

Returning to FIG. 5, system-wide scheduler 525 may analyze KPI specification information, information regarding measured KPIs, queue scheduler configuration information, and queue state information. For example, system-wide scheduler 525 may receive some or all of this information from KPI specification repository 505, KPI information module 510, scheduler configuration repository 515, queue state information module 520, and/or from another source. Based on some or all of this information, system-wide scheduler 525 may generate modified queue scheduler configurations for one or more network nodes, and may store and/or output the modified queue scheduler configurations to the one or more network nodes.

In some implementations, system-wide scheduler 525 may compare KPI information to a KPI specification, in order to determine whether KPIs are at acceptable levels (e.g., whether latency values are below a threshold maximum latency, whether throughput values are above a threshold minimum throughput, etc.). When KPIs are not at acceptable levels, system-wide scheduler 525 may modify parameters (e.g., parameters associated with a queue scheduler configuration) associated with one or more network nodes. When modifying queue scheduler configuration parameters, system-wide scheduler 525 may analyze existing queue scheduler configurations.

For example, assume that system-wide scheduler 525 identifies, based on a KPI specification (e.g., as received from KPI specification repository 505), that a maximum acceptable intra-node latency for a particular traffic flow, at base station 310, is 5 milliseconds ("ms"). Further assume that system-wide scheduler 525 identifies, based on received KPI information (e.g., as received from KPI information module 510), that an actual intra-node latency for the particular traffic flow, at base station 310, is 10 milliseconds. System-wide scheduler 525 may identify that the actual intra-node latency, for the traffic flow at base station 310, exceeds the specified maximum intra-node latency. System-wide scheduler 525 may therefore take remedial action based on identifying that the actual intra-node latency exceeds the specified maximum intra-node latency. For instance, system-wide scheduler 525 may modify a queue scheduler configuration associated with base station 310.

When modifying the queue scheduler configuration associated with base station 310, system-wide scheduler 525 may analyze a current queue scheduler configuration of base station 310 (e.g., information received from scheduler configuration repository 515), in order to identify parameters (such as queue scheduling algorithms and/or parameters associated with the algorithms) to modify. For example, system-wide scheduler 525 may determine that a queue priority, associated with the particular traffic flow, is relatively low, compared to queue priorities associated with other traffic flows or types of traffic. Based on this determination, system-wide scheduler 525 may, for example modify the queue scheduler configuration to increase the queue priority, associated with the particular traffic flow, relative to queue priorities associated with one or more other traffic flows or types of traffic.

In some implementations, system-wide scheduler 525 may additionally, or alternatively, analyze queue state information (e.g., information received from queue state information module 520) when modifying the queue scheduler configuration associated with base station 310. For example, assume that the queue state information indicates that packets are being dropped from a particular queue associated with the particular traffic, that a queue priority associated with the particular queue is lower than a queue priority associated with another queue, and that the queue occupancy of the other queue is relatively low. In this situation, system-wide scheduler 525 may modify the queue scheduler configuration using this information, in order to decrease the intra-node latency associated with base station 310. For instance, system-wide scheduler 525 may increase the queue priority of the particular queue, increase a queue length of the particular queue and/or the other queue, and/or decrease the priority of the other queue.

In some implementations, system-wide scheduler 525 may compare actual performance (e.g., KPIs received from KPI information module 510 and/or queue state information received from queue state information module 520) to average actual performance, measured over time. In this sense, system-wide scheduler 525 may dynamically identify spikes of unacceptable performance, and may take remedial action and/or alert an administrator regarding these spikes. For instance, assume that system-wide scheduler 525 identifies that the average latency of a particular segment, over a period of a day, is 10 ms. Further assume that system-wide scheduler 525 identifies a period of time where the measured latency (e.g., an instantaneous latency, or a latency averaged over a shorter time, such as one minute or one) exceeds 10 ms (e.g., by at least a threshold percentage, such as 10%, 50%, 100%, etc.). In such situations, system-wide scheduler 525 may modify a queue scheduler configuration, as described above.

In some implementations, system-wide scheduler 525 may perform the above methodology in an iterative fashion. That is, after modifying a queue scheduler configuration, system-wide scheduler 525 may continue to monitor KPIs and/or queue state information. Based on subsequently received KPIs and queue state information, system-wide scheduler 525 may determine if a previous adjustment was successful (e.g., whether the previous adjustment increased performance, and/or caused one or more KPIs to meet thresholds specified in a KPI specification). If the adjustment was successful, system-wide scheduler 525 may continue to make similar adjustments (e.g., if system-wide scheduler 525 reduced the value of a particular parameter, system-wide scheduler 525 may iteratively reduce the value of the parameter even further). If the adjustment was not successful, system-wide scheduler 525 may revert the queue scheduler configuration to an earlier state (e.g., may revert to a previous queue scheduler configuration). In this sense, system-wide scheduler 525 may continuously attempt to improve the performance of a network.

Figure 10A:
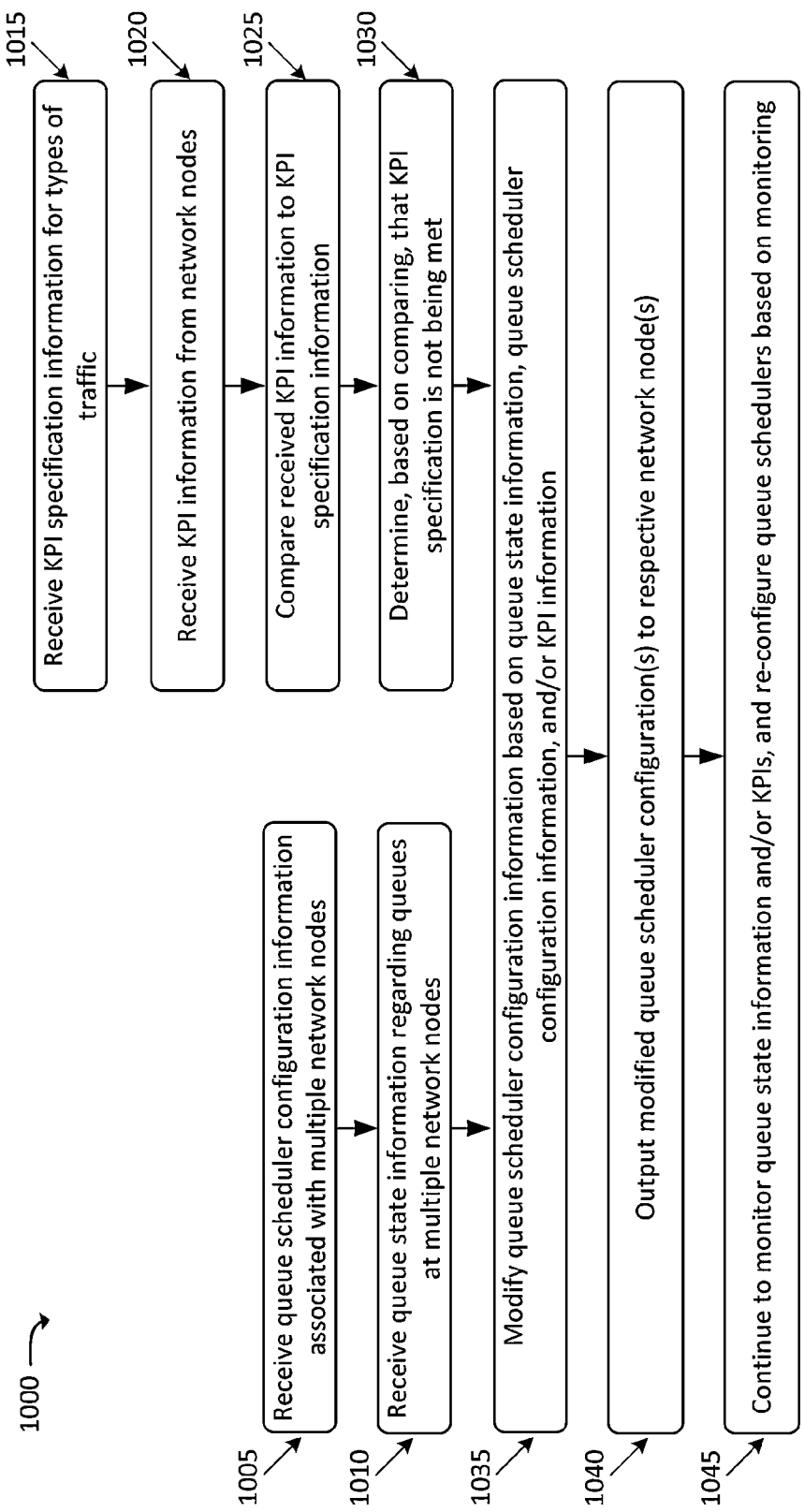
FIGS. 10A and 10B illustrate an example processes for system-wide queue scheduling based on various factors.

FIG. 10A illustrates an example process 1000 for modifying queue scheduling configurations of network nodes. In one example implementation, process 1000 may be performed by SWQSE 355. In other implementations, some or all of process 1000 may be performed by one or more other devices in lieu of, or in conjunction with, SWQSE 355.

Process 1000 may include receiving queue scheduler configuration information associated with multiple network nodes (block 1005). For example, as described above with respect to scheduler configuration repository 515, SWQSE 355 may receive queue scheduler information corresponding to base station 310, MLS 320, SGW 325, PGW 330, and/or one or more other network devices. As described in more detail above with respect to data structure 800, the queue scheduler information may include, for example, information that correlates particular types (e.g., particular applications, particular QCIs, particular subscribers, etc.) of traffic with particular queues. The queue scheduler information may also indicate a queue algorithm associated with a particular network node, as well as parameters associated with the respective queue algorithms (e.g., queue length, queue priority, packet dropping techniques, etc.).

Process 1000 may also include receiving queue state information regarding queues at the network nodes (block 1010). For example, as described above with respect to queue state information module 520, SWQSE 355 may receive queue state information from one or more network nodes. The queue state information may reflect actual measured values at the one or more network nodes, such as queue occupancy and queue drop rate. Examples of queue state information are described above with respect to data structures 900 and 950.

Process 1000 may further include receiving KPI specification information for types of traffic (block 1015). For example, as described above with respect to KPI specification repository 505, SWQSE 355 may receive KPI specification information, regarding network nodes and/or links between network nodes. The KPI specification information may indicate performance thresholds, which may correspond to minimum acceptable or desired levels of performance (e.g., latency, throughput, PELR, etc.). An example of a KPI specification is described above with respect to data structure 600.

Process 1000 may additionally include receiving KPI information from the network nodes (block 1020). For example, as described above with respect to KPI information module 510, SWQSE 355 may receive KPI information that reflects actual measured performance of network nodes and/or links between network nodes. In some implementations, SWQSE 355 may compute KPI information for links, based on KPI information, or other information, associated with network nodes that are at endpoints of the links. For instance, if a data packet left base station 310 at a time $t_0$ and arrived at MLS 320 at time $t_1$, SWQSE 355 may compute that a transport latency (e.g., a latency of a link between base station 310 and MLS 320, which may include backhaul network 315) is the difference between time $t_0$ and time $t_1$.

Process 1000 may also include comparing the received KPI information to the KPI specification information (block 1025). For example, as described above with respect to system-wide scheduler 525, SWQSE 355 may compare the KPI information (received at block 1020) to the KPI specification information (received at block 1015).

Returning to FIG. 10, process 1000 may further include determining, based on the comparing, that the KPI specification is not being met (block 1030). For example, SWQSE 355 may determine whether a particular KPI, in the KPI information received at block 1020, does not meet a threshold specified by the KPI specification. For instance, assume that the KPI specification indicates that a minimum throughput for a particular link is 10 megabytes per second ("MB/s"), and that the KPI information indicates that the actual measured throughput is 9 MB/s. In this example situation, SWQSE 355 may determine that the KPI specification is not being met.

Figure 11:
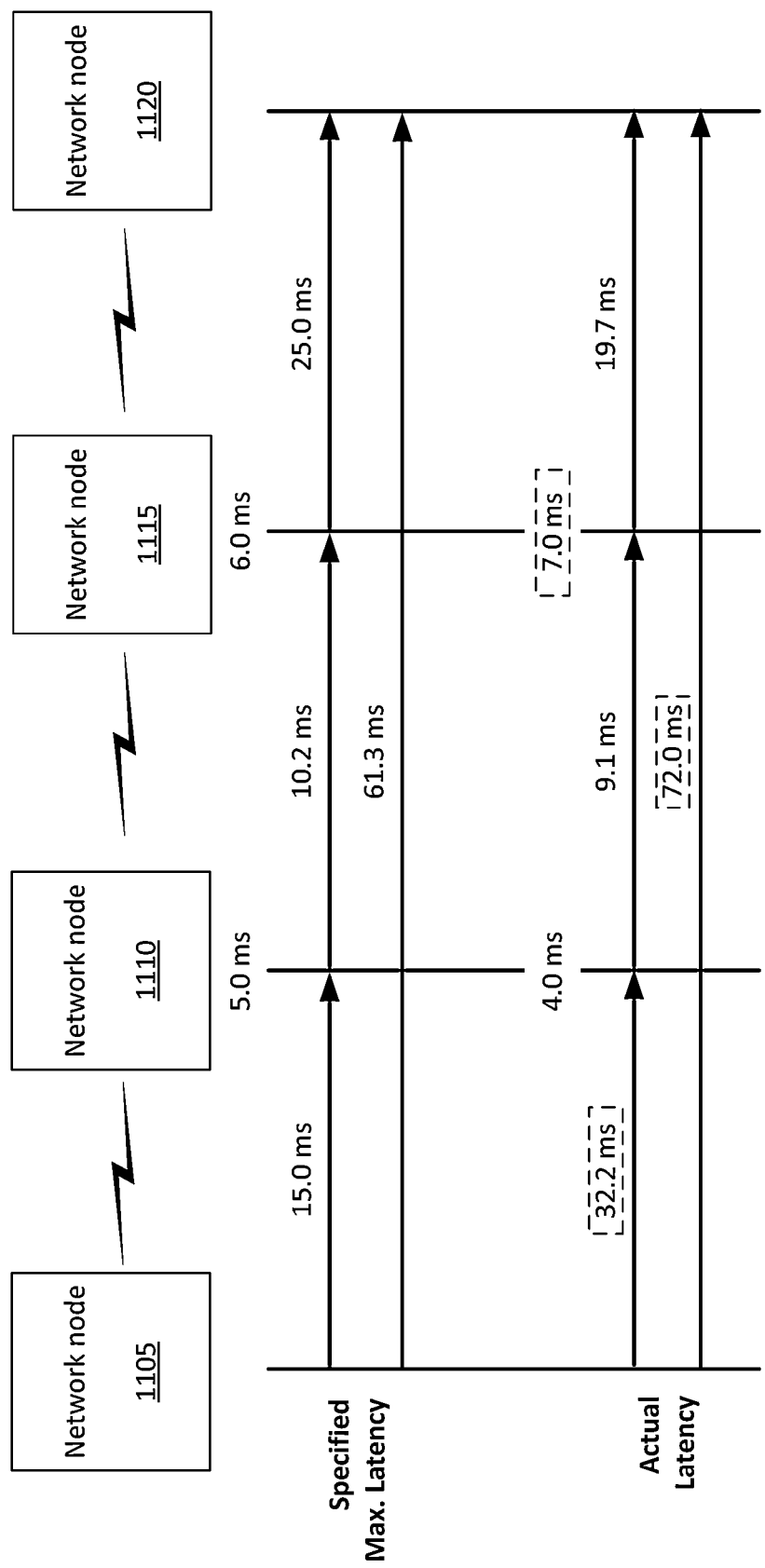
FIG. 11 illustrates an example user interface for providing information regarding overall and per-bearer analytics over individual transport links.

FIG. 11 conceptually illustrates an example of comparing a KPI specification to actual KPIs. For instance, a KPI specification may indicate maximum transport latencies for links between network nodes 1105-1120, as well as maximum intra-node latencies for network nodes 1110 and 1115. The KPI specification may further indicate a maximum latency over a network segment that includes network nodes 1105-1120, as well as the links between these nodes. The maximum specified latency for this segment may thus be based on maximum specified intra-node latencies, as well as on maximum specified transport latencies.

As shown in FIG. 11, for example, the specified maximum transport latency for the link between network nodes 1105 and 1110 may be 15.0 ms, and the maximum actual latency for the link may be 32.2 ms. Thus, SWQSE 355 may determine (at block 1030) that this actual transport latency does not meet the KPI specification. Other examples of actual KPIs not meeting KPI specifications are also illustrated in FIG. 11. For example, the intra-node latency of network node 1115 (7.0 ms) may exceed the specified maximum latency (6.0 ms), and the latency over the entire segment (72.0 ms) may exceed the specified maximum latency (61.3 ms).

Process 1000 may additionally include modifying one or more queue scheduler configurations based on the queue state information, the queue scheduler configuration information, and the KPI information (block 1035). For instance, as discussed above with respect to system-wide scheduler 525, SWQSE 355 may modify a queue scheduler configuration of one or more network nodes in order to improve performance (e.g., with respect to KPI(s) that is/are not meeting the KPI specification).

When modifying the queue scheduler configuration information, SWQSE 355 may attempt to avoid violating the KPI specification. For instance, assume that SWQSE 355 identifies that excessive packets are being dropped by a particular queue. One option for causing fewer packets to drop may be to lengthen the queue. This option, however, may lead to higher intra-node latency, since packets may sit longer in the queue while waiting to be processed. SWQSE 355 may, in some implementations, calculate or estimate the effects of certain modifications, and may avoid making these modifications if they would violate the KPI specification. Thus, if lengthening the queue would cause the intra-node latency, for traffic that is handled by the queue, to exceed a specified intra-node latency, SWQSE 355 may make different, or additional modifications. For instance, SWQSE 355 may increase a priority associated with the queue. In some implementations, SWQSE 355 may, in turn, decrease a priority associated with another queue (subject to KPI specifications associated with the other queue). When decreasing a priority associated with a queue, SWQSE 355 may, in some implementations, increase a length of the queue, in order to avoid or alleviate increasing the potential amount of packets that may be dropped from the queue.

Process 1000 may also include outputting the modified queue scheduler configuration(s) to respective network node (s) (block 1040). For instance, SWQSE 355 may output queue scheduler configuration(s) (modified at block 1035) to network nodes associated with the modified queue scheduler configurations. The network nodes may, in turn, perform queue scheduling according to the modified queue scheduler configurations.

Process 1000 may further include continuing to monitor queue state information and/or KPIs, and re-configure queue schedulers based on the monitoring (block 1045). For instance, as described above with respect to system-wide scheduler 525, SWQSE 355 may iteratively monitor and improve performance (e.g., by repeating one or more of steps 1005-1040).

Figure 10B:
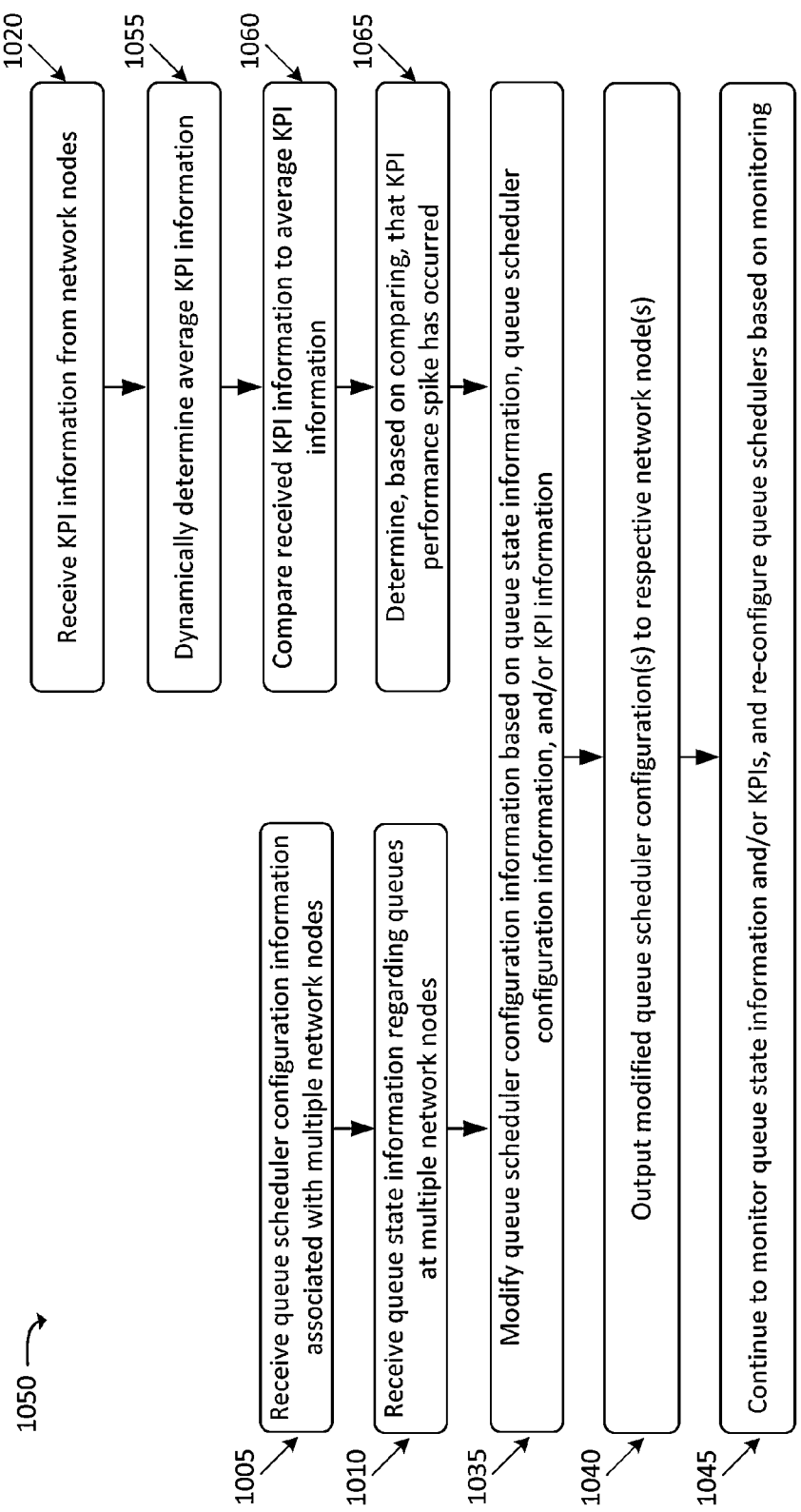

FIG. 10B illustrates an example process 1050 for modifying queue scheduling configurations of network nodes based on dynamic performance information. In one example implementation, process 1000 may be performed by SWQSE 355. In other implementations, some or all of process 1000 may be performed by one or more other devices in lieu of, or in conjunction with, SWQSE 355. Process 1050 may include blocks that are similar to blocks described above with respect to blocks 1000. These blocks are illustrated in FIG. 10B with the same reference numerals as shown in FIG. 10A. However, for the sake of brevity, these similar blocks are not described again with respect to FIG. 10B.

Process 1050 may include receiving KPI information from network nodes (block 1020). Process 1050 may further include dynamically determining average KPI information (block 1055). For example, as described above with respect to system-wide scheduler 525, SWQSE 355 may determine average KPI information, based on the KPI information received at block 1020. In some implementations, SWQSE 355 may determine the average KPI information over a rolling time window (e.g., over the last hour, over the last day, over the last week, or any other time window). In some implementations, SWQSE 355 may organize the average KPI information on a per-bearer basis, a per-QCI basis, a per-segment basis, a per-node basis, and/or in another fashion.

Process 1050 may additionally include comparing the received KPI information to the average KPI information (block 1060). Process 1050 may further include determining, based on the comparing, that a KPI performance spike has occurred (block 1065). For instance, as described above with respect to system-wide scheduler 525, SWQSE 355 may determine that one or more KPIs do not meet the KPI specification (e.g., a current latency is above a specified latency, a current throughput is below a specified throughput, etc.).

Based on determining that a performance spike has occurred, SWQSE 355 may take remedial measures. For example, process 1050 may further include blocks 1035-1045, which may be similar to blocks 1035-1045 discussed above with respect to FIG. 10A. In some implementations, processes 10A and 10B, or individual blocks from these processes, may be performed in combination. In other words, SWQSE 355 of some implementations may modify queue scheduler configurations based on comparing KPIs to KPI specifications, as well as to measured KPIs over time.

FIGS. 12-16 illustrate user interfaces that may display information regarding received KPIs. In some implementations, one or more of these user interfaces may be generated and provided by SWQSE 355, based on information received by SWQSE 355 (e.g., KPI information received from network nodes and stored by KPI information module 510) over time. These user interfaces may be useful for users, such as network administrators, who wish to view granular network performance information that is focused based on particular time windows, network nodes, and/or network segments.

Figure 12:
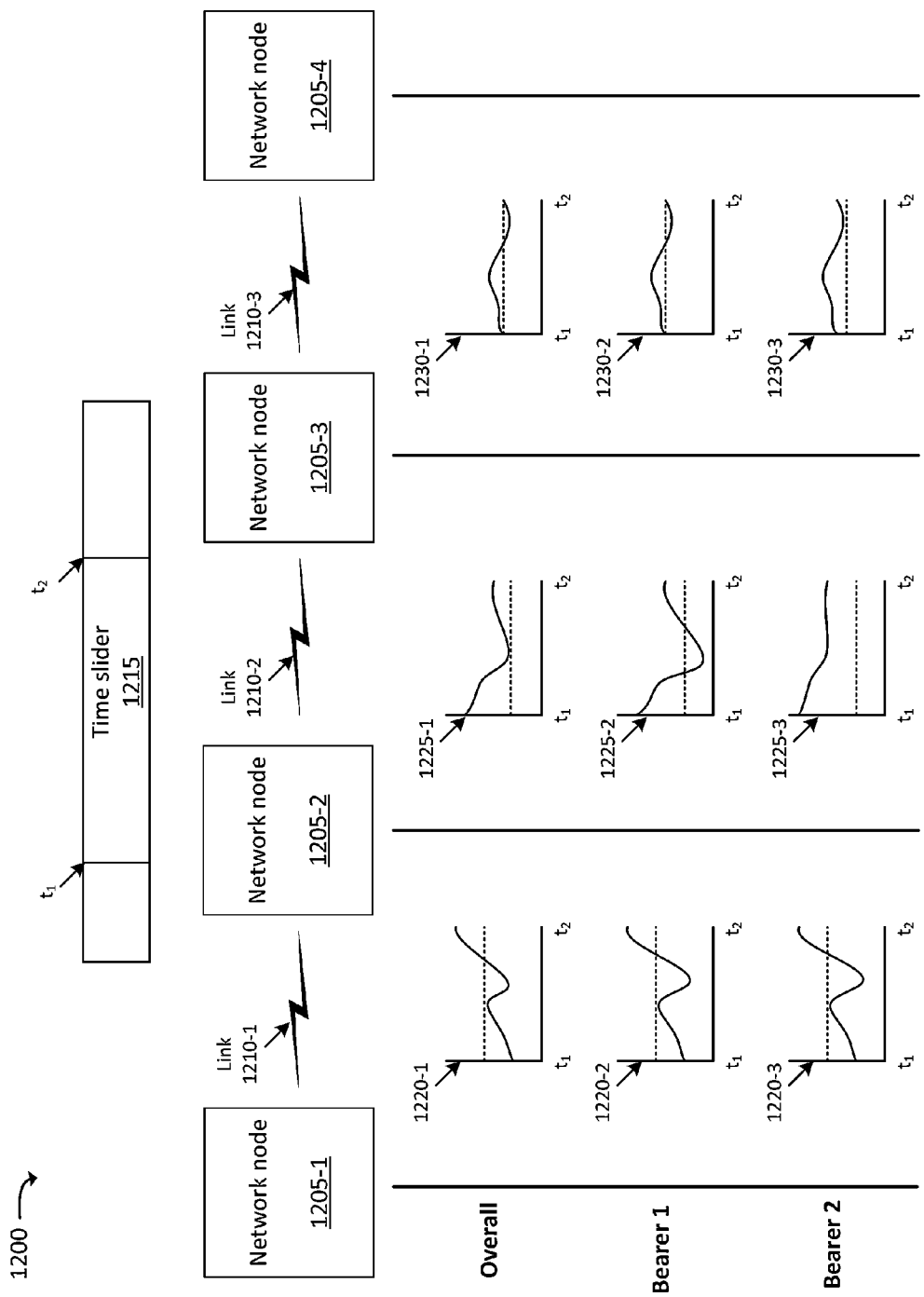
FIG. 12 illustrates an example of actual end-to-end and per-segment latency, as compared to specified maximum latency values.

User interface 1200, shown in FIG. 12, may graphically display KPIs, over a specific period of time, as they correspond to links between network nodes. As shown, information regarding the KPIs may be displayed on a per-bearer, per-link basis; as well as an overall per-link basis. The KPIs shown in FIG. 12 may be KPIs associated with links 1210-1 through 1210-3, which may be each be a link between two of network nodes 1205-1 through 1205-4.

The information shown in FIG. 12 may be associated with a particular time window. In some implementations, user interface 1200 may include a tool that allows a user to select a time window, such as time slider 1215. As shown, time slider 1215 may allow for selection of a starting time (shown as $t_1$) and an ending time (shown as $t_2$).

The x-axes, of the graphs shown in FIG. 12, may indicate time (e.g., time between $t_1$ and $t_2$), while the y-axes may indicate values associated with a particular KPI. For instance, the y-axes of these graphs may indicate latency values, throughput values, PELR values, and/or other KPI-related values.

Graphs 1220-1 through 1220-3 may be associated with link 1210-1, graphs 1225-1 through 1225-2 may be associated with link 1210-2, and graphs 1230-1 through 1230-3 may be associated with link 1210-3. Graphs 1220-1, 1225-1, and 1230-1 may display overall per-link KPI information, while graphs 1220-2, 1220-3, 1225-2, 1225-3, 1230-2, and 1230-3 may be display per-bearer, per-link KPI information. For instance, graph 1220-1 may be associated with all bearers across link 1210-1, while graph 1220-2 may be associated with a particular bearer ("Bearer 1") across link 1210-1.

The solid curves in the graphs may indicate actual measured KPI values, while the dashed lines in the graphs may indicate values indicated by KPI specifications. In this manner, these graphs may allow a user to quickly visibly ascertain when KPI specifications are not met, and the relationship of measured KPI values to KPI specifications.

Figure 13:
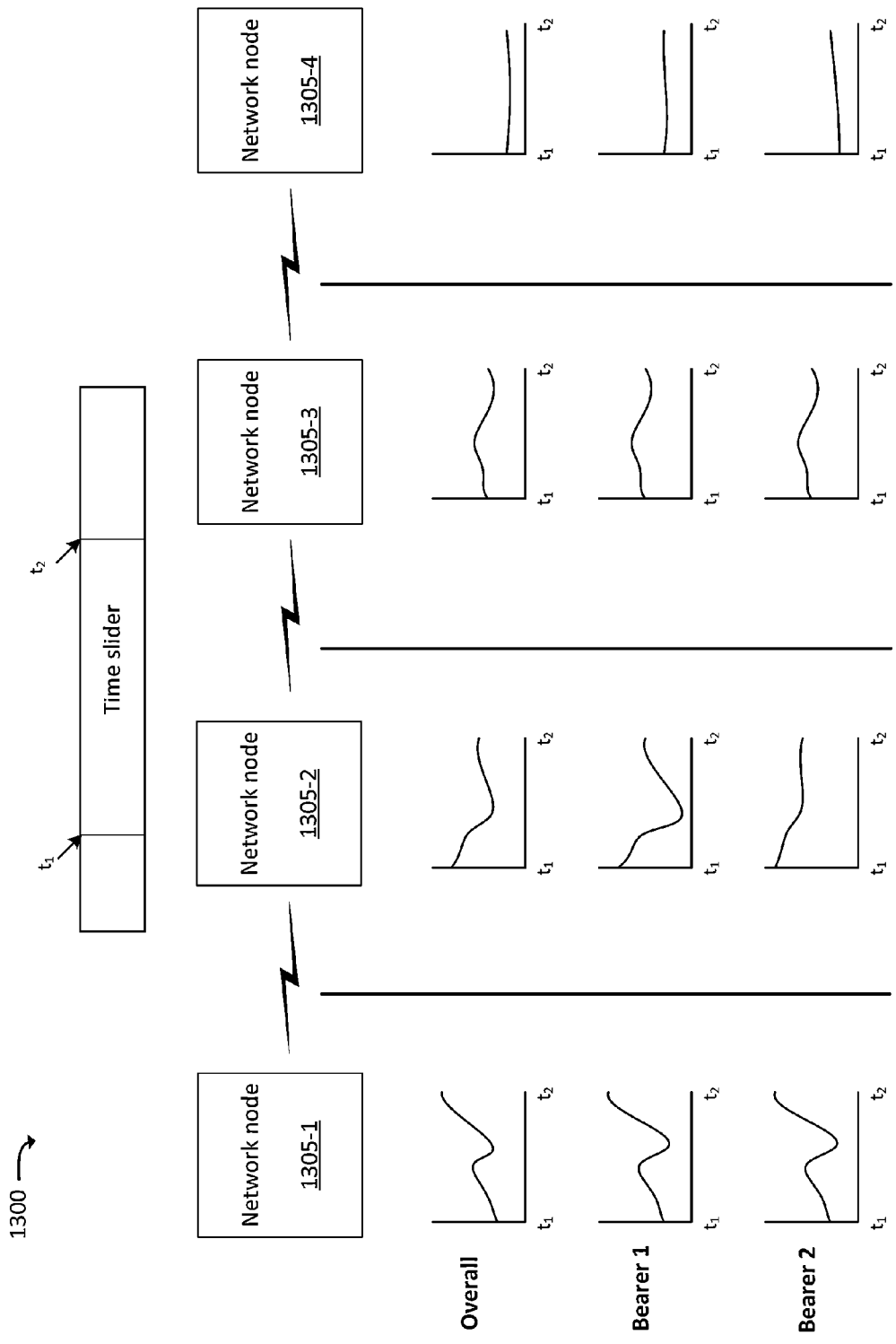
FIG. 13 illustrates an example user interface for providing information regarding overall and per-bearer analytics through individual network nodes.
Figure 14:
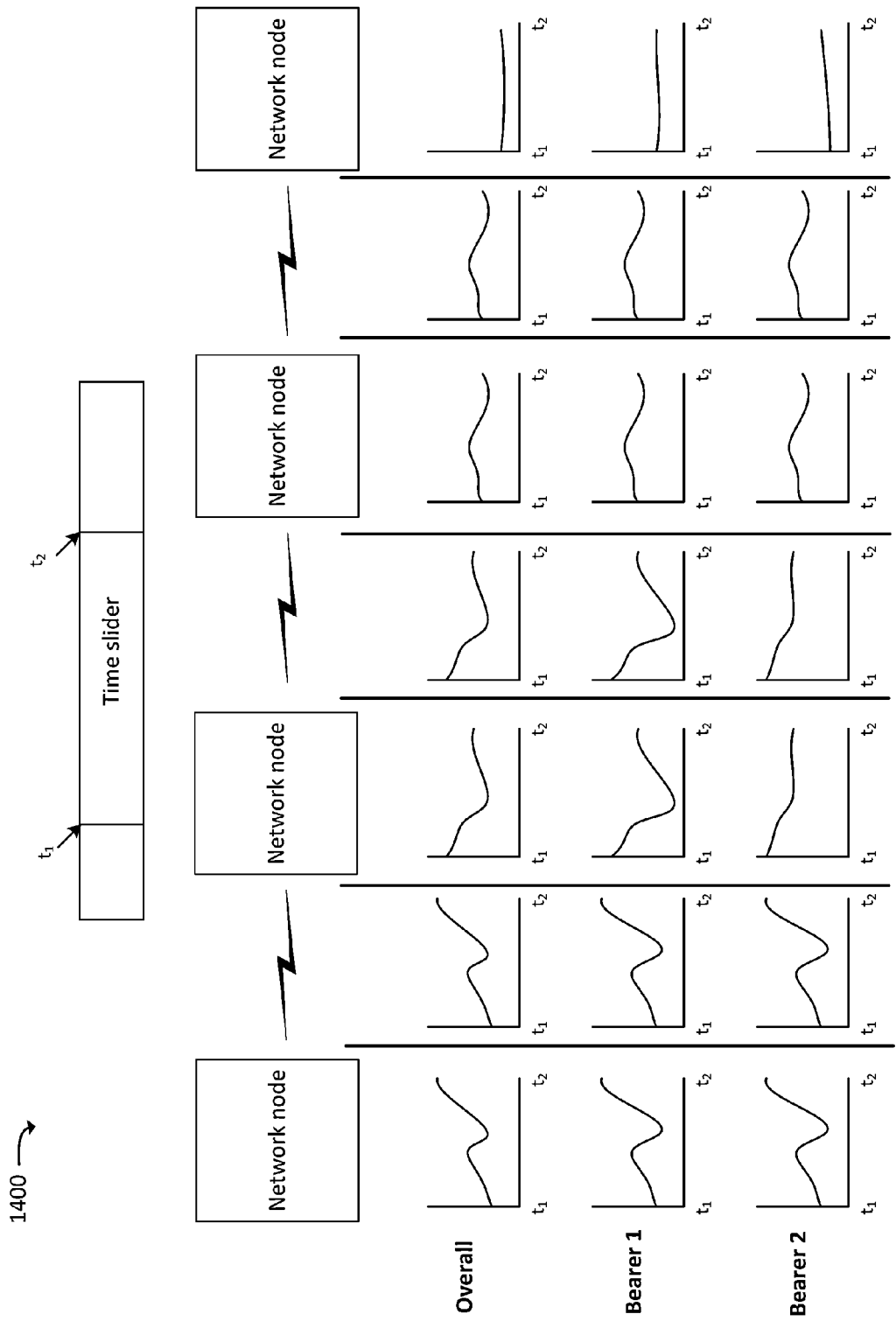
FIG. 14 illustrates an example user interface for providing information regarding overall and per-bearer analytics over individual transport links, as well as through individual network nodes.

User interface 1300, shown in FIG. 13, may be similar to user interface 1200. Instead of graphically displaying KPI information for links between nodes, user interface 1300 may graphically display KPI information for nodes 1305-1 through 1305-4. User interface 1400 may graphically display KPI information for links between nodes, as well as for nodes themselves.

Figure 15:
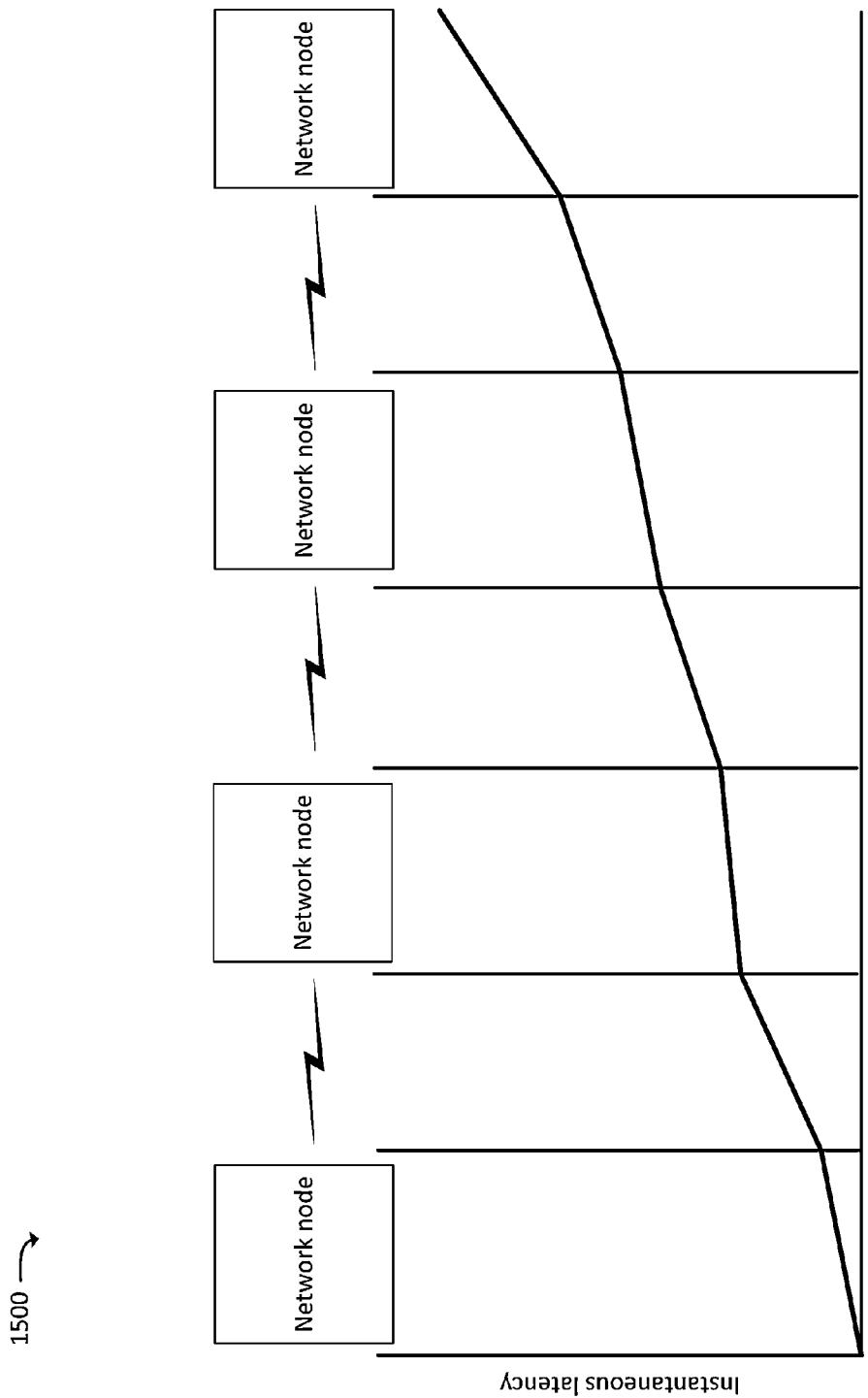
FIG. 15 illustrates an example user interface for providing information regarding instantaneous measurements recorded at various transport links and network nodes.
Figure 16:
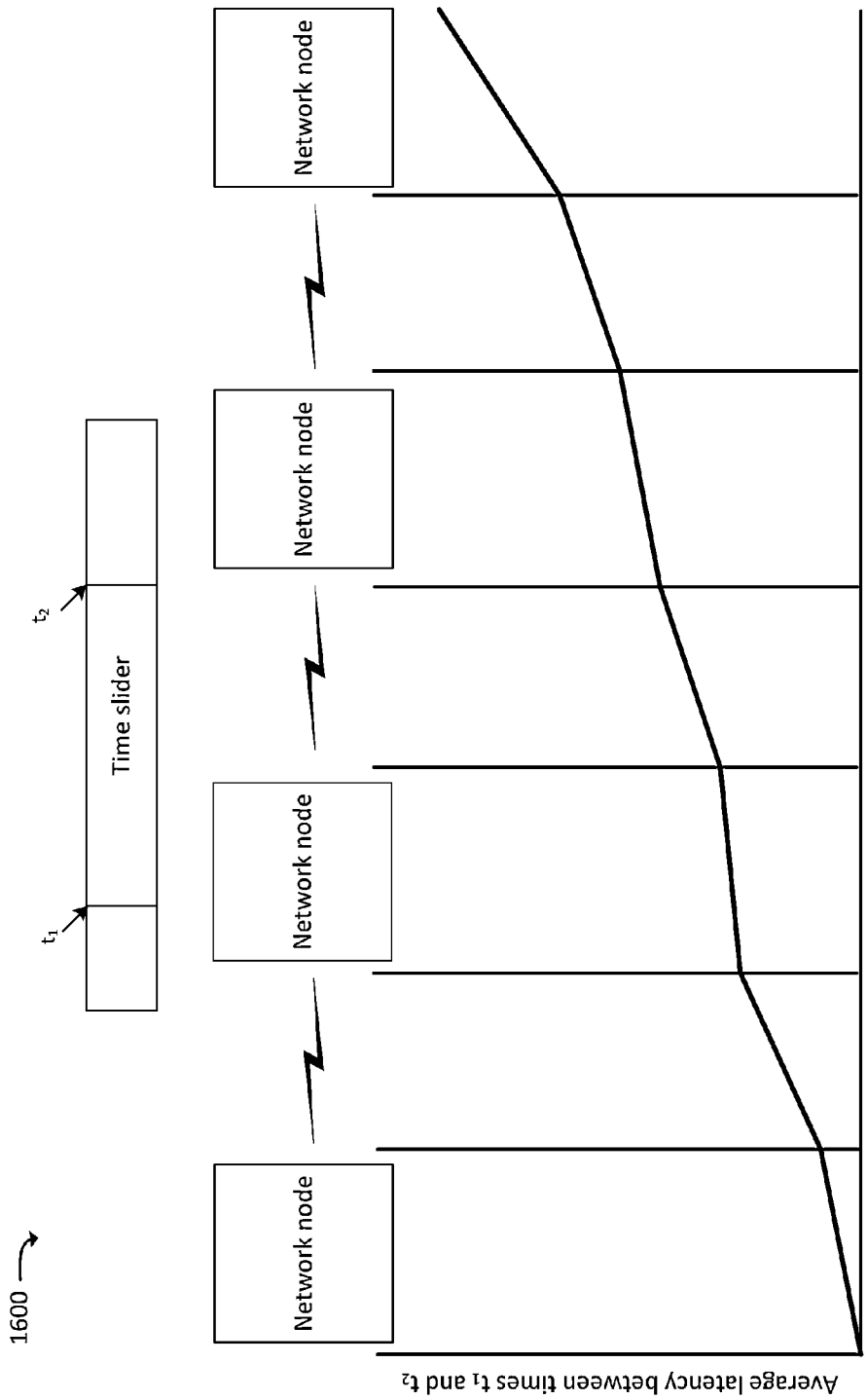
FIG. 16 illustrates an example user interface for providing information regarding measurements, averaged over a period of time, recorded at various transport links and network nodes.

FIG. 15 illustrates an example user interface 1500, which may graphically illustrate latency associated with various network nodes and links between the network nodes. The information shown in user interface 1500 may be based on, for example, KPI information received and/or stored by KPI information module 510. The x-axis of the graph may represent nodes and links in a traffic path, while the y-axis of the graph shown in FIG. 15 may represent latency associated with each respective node or link. The graph shown in FIG. 15 may be associated with latency measurements at a particular point in time (e.g., latency measurements taken at the same millisecond, at the same second, or at another "point" in time). The graph shown in FIG. 16 may be similar to the one shown in FIG. 15, with the exception that this graph may show average latency values over time (e.g., between $t_1$ and $t_2$).

Figure 17:
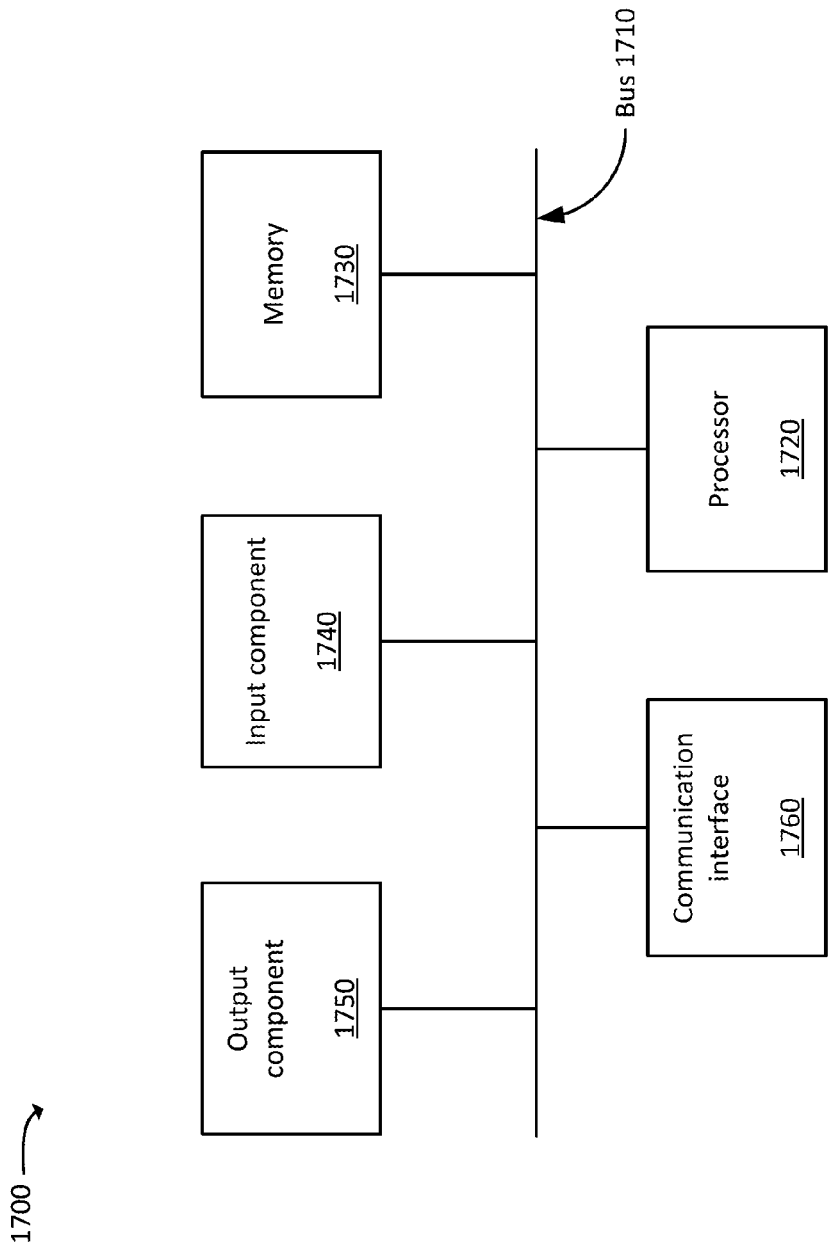
FIG. 17 illustrates example components of one or more devices, according to one or more implementations described herein.

FIG. 17 is a diagram of example components of device 1700. One or more of the devices illustrated in FIG. 1 or 3 may include one or more devices 1700. Device 1700 may include bus 1710, processor 1720, memory 1730, input component 1740, output component 1750, and communication interface 1760. In another implementation, device 1700 may include additional, fewer, different, or differently arranged components.

Bus 1710 may include one or more communication paths that permit communication among the components of device 1700. Processor 1720 may include a processor, microprocessor, or processing logic that may interpret and execute instructions. Memory 1730 may include any type of dynamic storage device that may store information and instructions for execution by processor 1720, and/or any type of non-volatile storage device that may store information for use by processor 1720.

Input component 1740 may include a mechanism that permits an operator to input information to device 1700, such as a keyboard, a keypad, a button, a switch, etc. Output component 1750 may include a mechanism that outputs information to the operator, such as a display, a speaker, one or more light emitting diodes ("LEDs"), etc.

Communication interface 1760 may include any transceiver-like mechanism that enables device 1700 to communicate with other devices and/or systems. For example, communication interface 1760 may include an Ethernet interface, an optical interface, a coaxial interface, or the like. Communication interface 1760 may include a wireless communication device, such as an infrared ("IR") receiver, a Bluetooth radio, or the like. The wireless communication device may be coupled to an external device, such as a remote control, a wireless keyboard, a mobile telephone, etc. In some embodiments, device 1700 may include more than one communication interface 1760. For instance, device 1700 may include an optical interface and an Ethernet interface.

Device 1700 may perform certain operations relating to one or more processes described above. Device 1700 may perform these operations in response to processor 1720 executing software instructions stored in a computer-readable medium, such as memory 1730. A computer-readable medium may be defined as a non-transitory memory device. A memory device may include space within a single physical memory device or spread across multiple physical memory devices. The software instructions may be read into memory 1730 from another computer-readable medium or from another device. The software instructions stored in memory 1730 may cause processor 1720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to FIG. 10, the order of the blocks may be modified in other implementations. Further, non-dependent blocks may be performed in parallel.

Additionally, while examples of data structures are illustrated in FIGS. 6, 7A, 7B, 8, 9A, and 9B as including certain types of information, in practice, these data structures may store additional, fewer, different, or differently arranged types of information than shown in these figures. Furthermore, while these data structures are shown as tables, in practice, these data structures may take the form of any other type of data structure, such as an array, a linked list, a hash table, a tree, and/or any other type of data structure.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items, and may be used interchangeably with the phrase "one or more." Where only one item is intended, the term "one" or similar language is used. Further, the phrase "based on" is intended to mean "based, at least in part, on" unless explicitly stated otherwise.

What is claimed is:

1. A method, comprising:
    receiving, by a server device, specification information specifying a threshold level of a key performance indicator ("KPI") for traffic that traverses one or more nodes of a network,
    the threshold level of the KPI including a threshold measure of occupancy of one or more queues associated with the one or more nodes;
    receiving, by the server device, information regarding measured values of the KPI, the measured values being associated with a segment of the network, the segment including at least two nodes of the network;
    comparing, by the server device, the specification information to the information regarding the measured values of the KPI, the comparing including:
    comparing measured values, of a measure of occupancy of the one or more queues associated with at least two nodes of the network, to the threshold measure of occupancy specified by the specification information;

determining, by the server device and based on the comparing, that the threshold level of the KPI is not met, the determining including:

determining that the measured values, of the measure of occupancy of the at least two nodes, exceeds the threshold measure of occupancy; and modifying, by the server device and based on the determining, a configuration of at least a particular node, of the one or more nodes of the network.

2. The method of claim 1, wherein modifying the configuration of the particular node includes:

modifying a queue scheduler configuration associated with the particular node.

3. The method of claim 2, wherein modifying the queue scheduler configuration includes at least one of:

modifying a queue scheduling technique associated with the queue scheduler configuration, or modifying a length of at least one queue associated with the queue scheduler configuration.

4. The method of claim 1, wherein the KPI includes a latency, and wherein the specified threshold level of the KPI further includes a maximum latency.

5. The method of claim 1, wherein the KPI includes a throughput, and wherein the specified threshold level of the KPI further includes a minimum throughput.

6. The method of claim 1, wherein the KPI includes a packet error loss rate ("PELR"), and wherein the specified threshold level of the KPI further includes a maximum PELR.

7. A method, comprising:

identifying, by a server device, a queue scheduler configuration associated with a particular node of a network that includes a plurality of nodes;

receiving, by the server device, queue state information regarding a segment of the network, the segment including the particular node and at least one other node of the network, wherein the queue state information includes information regarding a measure of occupancy of one or more queues associated with the segment;

determining, by the server device and based on the received queue state information, that a performance of the one or more queues does not meet a threshold measure of performance, the performance of the one or more queues not meeting the threshold measure of performance when the measure of occupancy of the one or more queues is above a threshold measure of occupancy;

receiving performance information regarding:

intra-node latency associated with the particular node, and throughput associated with the particular node;

determining that the intra-node latency and the throughput do not meet threshold performance values, generating, by the server device and based on determining that the performance of the one or more queues does not meet the threshold measure of performance, a modified queue scheduler configuration that is based on the identified queue scheduler configuration, wherein generating the modified queue scheduler configuration is further based on determining that the intra-node latency and the throughput do not meet the threshold performance values; and outputting, by the server device and to the particular node, the modified queue scheduler configuration.

8. The method of claim 7, wherein the queue scheduler configuration includes information regarding the one or more queues, the information specifying at least one of:

a first queue scheduler algorithm used to process packets stored in the one or more queues, a first set of queue lengths of the one or more queues, or a first set of queue weight assignments for the one or more queues; wherein the modified queue scheduler configuration includes at least one of:

a different second queue scheduler algorithm to be used to process packets stored in the one or more queues, a different second set of queue lengths of the one or more queues, or a different second set of queue weight assignments for the one or more queues.

9. The method of claim 7, wherein the one or more queues are each associated with at least one of:

a particular bearer, a particular quality of service class identifier ("QCI"), a particular application, or a particular user device.

10. The method of claim 7, wherein determining that the performance of the one or more queues does not meet the threshold of performance further includes:

determining that a drop rate, associated with a particular queue, of the one or more queues, is greater than a threshold drop rate, wherein generating the modified queue scheduler configuration includes at least one of:

increasing a priority associated with the particular queue from a first priority, specified by the queue scheduler configuration information, to a higher second priority, or increasing a queue length associated with the particular queue.

11. The method of claim 10, further comprising:

receiving performance information regarding at least one of:

threshold intra-node latency associated with the particular node, or threshold throughput associated with the particular node, and wherein generating the modified queue scheduler configuration further comprises:

determining that modifying the modified queue scheduler configuration will not cause intra-node latency or throughput, associated with the particular node, to fail to meet the threshold intra-node latency or threshold throughput.

12. The method of claim 7, wherein the node implements a first scheduling technique prior to receiving the modified scheduler configuration, wherein, after receiving the modified scheduler configuration, the particular node implements a second scheduling technique in lieu of implementing the first scheduling technique.

13. The method of claim 7, wherein the scheduler configuration associated with the particular node identifies a particular scheduling technique to be used by the node to process packets, wherein the particular scheduling technique includes at least one of:

a round-robin scheduling technique, a proportional fair scheduling technique, a weighted first queuing scheduling technique, a shortest job first scheduling technique, a shortest time remaining scheduling technique, a fixed priority preemptive scheduling technique, or a multi-level queue scheduling technique.

14. The method of claim 7, wherein the particular node includes at least one of:

a base station, a serving gateway,
a cell site router,
a multi-layer switch, or
a packet data network gateway.

15. A system, comprising:
a memory device storing a set of computer-executable instructions; and
one or more processors configured to execute the computer-executable instructions, wherein executing the computer-executable instructions causes the one or more processors to:
receive measured values of one or more performance metrics associated with a segment of a network, the segment including two or more nodes of the network,
a particular performance metric, of the one or more performance metrics, including one or more measures of occupancy of one or more queues associated with at least one of the two or more nodes;
determine that the measured values, of the one or more performance metrics associated with the segment of the network, do not meet a threshold level of performance,
the determination including a determination that the one or more measures of occupancy exceed a threshold measure of occupancy;
receive performance information regarding:
intra-node latency associated with a particular node, of the two or more nodes, and throughput associated with the particular node;
determine that the intra-node latency and the throughput do not meet threshold performance values,
generate, based on a present queue configuration of the particular node and based on determining that the threshold level of performance is not met, a new queue configuration for the particular nod;
wherein generating the new queue scheduler configuration is further based on determining that the intra-node latency and the throughput do not meet the threshold performance values; and
output the new queue configuration to the particular node, the particular node implementing the new queue configuration based on receiving the new queue configuration.

16. The system of claim 15, wherein the measured values of the one or more performance metrics are average values measured over a particular period of time.

17. The system of claim 15, wherein the specification information includes a quality of service class identifier ("QCI").

18. The system of claim 15, wherein the performance metrics further include at least one of:
a packet error loss rate ("PELR") of packets transported via the segment;
a transport latency associated with the segment; or
a throughput of traffic transported via the segment.

19. The system of claim 18, wherein the performance metrics further include a drop rate of one or more queues of a particular node of the segment.

20. The system of claim 19, wherein the particular node implements a first scheduling technique prior to receiving the new queue configuration,
wherein, after receiving the new queue configuration, the particular node implements a second scheduling technique in lieu of implementing the first scheduling technique.

* * * * *